(12) United States Patent
Sakashita et al.

(10) Patent No.: US 8,300,155 B2
(45) Date of Patent: Oct. 30, 2012

(54) BROADCAST RECEIVING DEVICE AND PROGRAM SELECTING METHOD

(75) Inventors: Kazuhiro Sakashita, Tokyo (JP); Yasushi Onishi, Tokyo (JP); Kazuhiro Shimakawa, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 613 days.

(21) Appl. No.: 12/523,284

(22) PCT Filed: Jan. 25, 2007

(86) PCT No.: PCT/JP2007/051137
§ 371 (c)(1),
(2), (4) Date: Jul. 15, 2009

(87) PCT Pub. No.: WO2008/090610
PCT Pub. Date: Jul. 31, 2008

(65) Prior Publication Data
US 2010/0091192 A1    Apr. 15, 2010

(51) Int. Cl.
*H04N 5/50* (2006.01)
(52) U.S. Cl. ......... 348/732; 348/570; 348/731; 348/734
(58) Field of Classification Search .......... 348/731–733, 348/725, 726, 728, 570, 734; 725/44, 38, 725/46, 56, 72; 455/182.3, 192.2, 192.3; *H04N 5/50*
See application file for complete search history.

(56) References Cited

U.S. PATENT DOCUMENTS

| | | | | |
|---|---|---|---|---|
| 7,375,771 | B2* | 5/2008 | Naoi et al. | 348/732 |
| 7,787,061 | B2* | 8/2010 | Kurose et al. | 348/731 |
| 2002/0036709 | A1 | 3/2002 | Nishida et al. | |
| 2003/0088870 | A1* | 5/2003 | Wang | 725/44 |
| 2004/0107207 | A1 | 6/2004 | Kondo et al. | |
| 2005/0144637 | A1 | 6/2005 | Shikata et al. | |
| 2005/0253808 | A1 | 11/2005 | Yoshida | |
| 2005/0289609 | A1* | 12/2005 | Takagi et al. | 725/72 |

FOREIGN PATENT DOCUMENTS

| | | |
|---|---|---|
| JP | 6-124309 | 5/1994 |
| JP | 07-131727 A | 5/1995 |
| JP | 2001-218124 | 8/2001 |
| JP | 2001-237789 | 8/2001 |
| JP | 2002-112131 | 4/2002 |
| JP | 2002-135221 | 5/2002 |
| JP | 2004-056630 | 2/2004 |
| JP | 2005-210686 | 8/2005 |
| JP | 2005-328379 A | 11/2005 |

OTHER PUBLICATIONS

Japanese Notice of Grounds of Rejection, w/ English translation thereof, issued in Japanese Patent Application No. 2008-554934, dated Mar. 13, 2012.

\* cited by examiner

*Primary Examiner* — Trang U Tran
(74) *Attorney, Agent, or Firm* — McDermott Will & Emery LLP

(57) ABSTRACT

A tuner receives broadcast data on specified channels. A channel search unit controls the tuner to search for available channels, and creates a channel map representing the available channels and a selection order thereof. A channel order setting unit changes setting about enabling/disabling of the selection and/or the selection order of the channels in the channel map. An operation input unit accepts a channel selecting operation of a user. When the user performs an operation for channel forward selection or channel reverse selection through the operation input unit, a channel switching unit changes the selection of the channel according to the channel map and causes the tuner to receive the broadcast data on the selected channel.

2 Claims, 47 Drawing Sheets

FIG.4

| ADDRESS | VIRTUAL CHANNEL NUMBER | PHYSICAL CHANNEL NUMBER | ANALOG/ DIGITAL | PREVIOUS CHANNEL ADDRESS | NEXT CHANNEL ADDRESS | LEADING CHANNEL |
|---|---|---|---|---|---|---|
| 0x00 | 2 | 2 | ANALOG | 0xD0 | 0x10 | S |
| 0x10 | 5 | 5 | ANALOG | 0x00 | 0x20 | |
| 0x20 | 7 | 7 | ANALOG | 0x10 | 0x30 | |
| 0x30 | 8 | 8 | ANALOG | 0x20 | 0x40 | |
| 0x40 | 8-1 | 3 | DIGITAL | 0x30 | 0x50 | |
| 0x50 | 8-2 | 3 | DIGITAL | 0x40 | 0x60 | |
| 0x60 | 8-3 | 3 | DIGITAL | 0x50 | 0x70 | |
| 0x70 | 9 | 9 | ANALOG | 0x60 | 0x80 | |
| 0x80 | 18-1 | 6 | DIGITAL | 0x70 | 0x90 | |
| 0x90 | 18-2 | 6 | DIGITAL | 0x80 | 0xA0 | |
| 0xA0 | 18-3 | 6 | DIGITAL | 0x90 | 0xB0 | |
| 0xB0 | 26-1 | 4 | DIGITAL | 0xA0 | 0xC0 | |
| 0xC0 | 26-2 | 4 | DIGITAL | 0xB0 | 0xD0 | |
| 0xD0 | 26-3 | 4 | DIGITAL | 0xC0 | 0x00 | |

| CHANNEL | 2 | 5 | 7 | 8 | 8-1 | 8-2 | 8-3 | 9 | 18-1 | 18-2 | 18-3 | 26-1 | 26-2 | 26-3 |
|---|---|---|---|---|---|---|---|---|---|---|---|---|---|---|
| 19:00 | NEWS XXX | DRAMA XXXX | XX LESSON | PRO. BASEBALL REGULAR GAME X-Y | PRO. BASEBALL REGULAR GAME X-Y | PRO. BASEBALL REGULAR GAME X-Y | PRO. BASEBALL REGULAR GAME X-Y | QUIZ AAAA | MOVIE A | MOVIE A | MOVIE A | GOLF XX OPEN | GOLF XX OPEN | GOLF XX OPEN |
| 20:00 | POPULAR SONG XXXX | REPORT YY | YY LESSON | | | | | | | | | | | |
| | | | ZZ LESSON | | | | | NEWS ZZZ | | | | | | |
| 21:00 | X-DAY DRAMA | SOCCER XX PRELIMINARY | AA LESSON | DRAMA YYYY | DRAMA YYYY | DRAMA YYYY | DRAMA YYYY | DRAMA AAAA | MOVIE B | MOVIE B | MOVIE B | DRAMA ZZZZ | DRAMA ZZZZ | DRAMA ZZZZ |
| | | | | NEWS YYY | NEWS YYY | NEWS YYY | NEWS YYY | | | | | | | |
| 23:00 | | | | | | | | | | | | | | |

(b)

| CHANNEL | 2 | 5 | 7 | 8 | 8-1 | 8-2 | 8-3 | 9 | 18-1 | 18-2 | 18-3 | 26-1 | 26-2 | 26-3 |
|---|---|---|---|---|---|---|---|---|---|---|---|---|---|---|
| 19:00 | NEWS XXX | DRAMA XXXX | XX LESSON | PRO. BASEBALL REGULAR GAME X-Y | PRO. BASEBALL REGULAR GAME X-Y | PRO. BASEBALL REGULAR GAME X-Y | PRO. BASEBALL REGULAR GAME X-Y | QUIZ AAAA | MOVIE A | MOVIE A | MOVIE A | GOLF XX OPEN | GOLF XX OPEN | GOLF XX OPEN |
| 20:00 | POPULAR SONG XXXX | REPORT YY | YY LESSON | | | | | | | | | | | |
| | | | ZZ LESSON | | | | | NEWS ZZZ | | | | | | |
| 21:00 | X-DAY DRAMA | SOCCER XX PRELIMINARY | AA LESSON | DRAMA YYYY | DRAMA YYYY | DRAMA YYYY | DRAMA YYYY | DRAMA AAAA | MOVIE B | MOVIE B | MOVIE B | DRAMA ZZZZ | DRAMA ZZZZ | DRAMA ZZZZ |
| | | | | NEWS YYY | NEWS YYY | NEWS YYY | NEWS YYY | | | | | | | |
| 23:00 | | | | | | | | | | | | | | |

FIG.7

| ADDRESS | VIRTUAL CHANNEL NUMBER | PHYSICAL CHANNEL NUMBER | ANALOG/ DIGITAL | PREVIOUS CHANNEL ADDRESS | NEXT CHANNEL ADDRESS | LEADING CHANNEL |
|---|---|---|---|---|---|---|
| 0x00 | 2 | 2 | ANALOG | 0xD0 | 0x10 | S |
| 0x10 | 5 | 5 | ANALOG | 0x00 | 0x20 | |
| 0x20 | 7 | 7 | ANALOG | 0x10 | 0x70 | |
| 0x30 | 8 | 8 | ANALOG | 0x20 | 0x40 | |
| 0x40 | 8-1 | 3 | DIGITAL | 0x30 | 0x50 | |
| 0x50 | 8-2 | 3 | DIGITAL | 0x40 | 0x60 | |
| 0x60 | 8-3 | 3 | DIGITAL | 0x50 | 0x70 | |
| 0x70 | 9 | 9 | ANALOG | 0x20 | 0x80 | |
| 0x80 | 18-1 | 6 | DIGITAL | 0x70 | 0x90 | |
| 0x90 | 18-2 | 6 | DIGITAL | 0x80 | 0xA0 | |
| 0xA0 | 18-3 | 6 | DIGITAL | 0x90 | 0xB0 | |
| 0xB0 | 26-1 | 4 | DIGITAL | 0xA0 | 0xC0 | |
| 0xC0 | 26-2 | 4 | DIGITAL | 0xB0 | 0xD0 | |
| 0xD0 | 26-3 | 4 | DIGITAL | 0xC0 | 0x00 | |

FIG.9

| CHANNEL | 2 | 5 | 7 | 9 | 18-1 | 18-2 | 18-3 | 26-1 | 26-2 | 26-3 |
|---|---|---|---|---|---|---|---|---|---|---|
| 19:00 | NEWS XXX | DRAMA XXXX | XX LESSON | QUIZ AAAA | MOVIE A | MOVIE A | MOVIE A | | | |
| 20:00 | POPULAR SONG XXXX | REPORT YY | YY LESSON | | | | | GOLF XX OPEN | GOLF XX OPEN | GOLF XX OPEN |
| 21:00 | X-DAY DRAMA | SOCCER XX PRELIMINARY | ZZ LESSON | NEWS ZZZ | MOVIE B | MOVIE B | MOVIE B | DRAMA ZZZZ | DRAMA ZZZZ | DRAMA ZZZZ |
| | | | AA LESSON | DRAMA AAAA | | | | | | |
| 23:00 | | | | | | | | | | |

FIG.10

| ADDRESS | VIRTUAL CHANNEL NUMBER |
|---|---|
| 0x100 | 2 |
| 0x110 | 5 |
| 0x120 | 7 |
| 0x130 | 9 |
| 0x140 | 18-1 |
| 0x150 | 18-2 |
| 0x160 | 18-3 |
| 0x170 | 26-1 |
| 0x180 | 26-2 |
| 0x190 | 26-3 |

FIG.11

| ADDRESS | VIRTUAL CHANNEL NUMBER | PHYSICAL CHANNEL NUMBER | ANALOG/ DIGITAL | PREVIOUS CHANNEL ADDRESS | NEXT CHANNEL ADDRESS | LEADING CHANNEL |
|---|---|---|---|---|---|---|
| 0x00 | 2 | 2 | ANALOG | 0xD0 | 0x10 | S |
| 0x10 | 5 | 5 | ANALOG | 0x00 | 0x30 | |
| 0x20 | 7 | 7 | ANALOG | 0x60 | 0x70 | |
| 0x30 | 8 | 8 | ANALOG | 0x10 | 0x40 | |
| 0x40 | 8-1 | 3 | DIGITAL | 0x30 | 0x50 | |
| 0x50 | 8-2 | 3 | DIGITAL | 0x40 | 0x60 | |
| 0x60 | 8-3 | 3 | DIGITAL | 0x50 | 0x20 | |
| 0x70 | 9 | 9 | ANALOG | 0x20 | 0x80 | |
| 0x80 | 18-1 | 6 | DIGITAL | 0x70 | 0x90 | |
| 0x90 | 18-2 | 6 | DIGITAL | 0x80 | 0xA0 | |
| 0xA0 | 18-3 | 6 | DIGITAL | 0x90 | 0xB0 | |
| 0xB0 | 26-1 | 4 | DIGITAL | 0xA0 | 0xC0 | |
| 0xC0 | 26-2 | 4 | DIGITAL | 0xB0 | 0xD0 | |
| 0xD0 | 26-3 | 4 | DIGITAL | 0xC0 | 0x00 | |

FIG.13

| CHANNEL | 2 | 5 | 8 | 8-1 | 8-2 | 8-3 | 7 | 9 | 18-1 | 18-2 | 18-3 | 26-1 | 26-2 | 26-3 |
|---|---|---|---|---|---|---|---|---|---|---|---|---|---|---|
| 19:00 | NEWS XXX | DRAMA XXXX | PRO. BASEBALL REGULAR GAME X-Y | PRO. BASEBALL REGULAR GAME X-Y | PRO. BASEBALL REGULAR GAME X-Y | PRO. BASEBALL REGULAR GAME X-Y | XX LESSON | QUIZ AAAA | MOVIE A | MOVIE A | MOVIE A | GOLF XX OPEN | GOLF XX OPEN | GOLF XX OPEN |
| 20:00 | POPULAR SONG XXXX | REPORT YY | | | | | YY LESSON | | | | | | | |
| 21:00 | X-DAY DRAMA | SOCCER XX PRELIMINARY | DRAMA YYYY | DRAMA YYYY | DRAMA YYYY | DRAMA YYYY | ZZ LESSON | NEWS ZZZ | MOVIE B | MOVIE B | MOVIE B | DRAMA ZZZZ | DRAMA ZZZZ | DRAMA ZZZZ |
| 23:00 | | | NEWS YYY | NEWS YYY | NEWS YYY | NEWS YYY | AA LESSON | DRAMA AAAA | | | | | | |

FIG.14

| ADDRESS | VIRTUAL CHANNEL NUMBER |
|---|---|
| 0x100 | 2 |
| 0x110 | 5 |
| 0x120 | 8 |
| 0x130 | 8-1 |
| 0x140 | 8-2 |
| 0x150 | 8-3 |
| 0x160 | 7 |
| 0x170 | 9 |
| 0x180 | 18-1 |
| 0x190 | 18-2 |
| 0x1A0 | 18-3 |
| 0x1B0 | 26-1 |
| 0x1C0 | 26-2 |
| 0x1D0 | 26-3 |

FIG.15

| ADDRESS | VIRTUAL CHANNEL NUMBER | PHYSICAL CHANNEL NUMBER | ANALOG/ DIGITAL | PREVIOUS CHANNEL ADDRESS | NEXT CHANNEL ADDRESS | LEADING CHANNEL |
|---|---|---|---|---|---|---|
| 0x00 | 2 | 2 | ANALOG | 0xD0 | 0x10 | S |
| 0x10 | 5 | 5 | ANALOG | 0x00 | 0x70 | |
| 0x20 | 7 | 7 | ANALOG | 0x70 | 0x80 | |
| 0x30 | 8 | 8 | ANALOG | 0x20 | 0x40 | |
| 0x40 | 8-1 | 3 | DIGITAL | 0x30 | 0x50 | |
| 0x50 | 8-2 | 3 | DIGITAL | 0x40 | 0x60 | |
| 0x60 | 8-3 | 3 | DIGITAL | 0x50 | 0x70 | |
| 0x70 | 9 | 9 | ANALOG | 0x10 | 0x20 | |
| 0x80 | 18-1 | 6 | DIGITAL | 0x20 | 0x90 | |
| 0x90 | 18-2 | 6 | DIGITAL | 0x80 | 0xA0 | |
| 0xA0 | 18-3 | 6 | DIGITAL | 0x90 | 0xB0 | |
| 0xB0 | 26-1 | 4 | DIGITAL | 0xA0 | 0xC0 | |
| 0xC0 | 26-2 | 4 | DIGITAL | 0xB0 | 0xD0 | |
| 0xD0 | 26-3 | 4 | DIGITAL | 0xC0 | 0x00 | |

FIG.17

| CHANNEL | 2 | 5 | 9 | 7 | 18-1 | 18-2 | 18-3 | 26-1 | 26-2 | 26-3 |
|---|---|---|---|---|---|---|---|---|---|---|
| 19:00 | NEWS XXX | DRAMA XXXX | QUIZ AAAA | XX LESSON | MOVIE A | MOVIE A | MOVIE A | | | |
| 20:00 | POPULAR SONG XXXX | REPORT YY | | YY LESSON | MOVIE A | MOVIE A | MOVIE A | GOLF XX OPEN | GOLF XX OPEN | GOLF XX OPEN |
| 21:00 | X-DAY DRAMA | SOCCER XX PRELIMINARY | NEWS ZZZ | ZZ LESSON | MOVIE B | MOVIE B | MOVIE B | DRAMA ZZZZ | | |
| | | | DRAMA AAAA | AA LESSON | MOVIE B | MOVIE B | MOVIE B | DRAMA ZZZZ | DRAMA ZZZZ | DRAMA ZZZZ |
| 23:00 | | | | | | | | | | |

FIG.18

| ADDRESS | VIRTUAL CHANNEL NUMBER |
|---|---|
| 0x100 | 2 |
| 0x110 | 5 |
| 0x120 | 9 |
| 0x130 | 7 |
| 0x140 | 18-1 |
| 0x150 | 18-2 |
| 0x160 | 18-3 |
| 0x170 | 26-1 |
| 0x180 | 26-2 |
| 0x190 | 26-3 |

FIG.19

| ADDRESS | VIRTUAL CHANNEL NUMBER | PHYSICAL CHANNEL NUMBER | ANALOG/ DIGITAL | PREVIOUS CHANNEL ADDRESS | NEXT CHANNEL ADDRESS | LEADING CHANNEL |
|---|---|---|---|---|---|---|
| 0x00 | 2 | 2 | ANALOG | 0xD0 | 0x10 | S |
| 0x10 | 5 | 5 | ANALOG | 0x00 | 0x20 | |
| 0x20 | 7 | 7 | ANALOG | 0x10 | 0x30 | |
| 0x30 | 8 | 8 | ANALOG | 0x20 | 0x70 | |
| 0x40 | 8-1 | 3 | DIGITAL | 0x30 | 0x50 | |
| 0x50 | 8-2 | 3 | DIGITAL | 0x40 | 0x60 | |
| 0x60 | 8-3 | 3 | DIGITAL | 0x50 | 0x70 | |
| 0x70 | 9 | 9 | ANALOG | 0x30 | 0x80 | |
| 0x80 | 18-1 | 6 | DIGITAL | 0x70 | 0x90 | |
| 0x90 | 18-2 | 6 | DIGITAL | 0x80 | 0xA0 | |
| 0xA0 | 18-3 | 6 | DIGITAL | 0x90 | 0xB0 | |
| 0xB0 | 26-1 | 4 | DIGITAL | 0xA0 | 0xC0 | |
| 0xC0 | 26-2 | 4 | DIGITAL | 0xB0 | 0xD0 | |
| 0xD0 | 26-3 | 4 | DIGITAL | 0xC0 | 0x00 | |

FIG.21

| CHANNEL | 2 | 5 | 7 | 8 | 9 | 18-1 | 18-2 | 18-3 | 26-1 | 26-2 | 26-3 |
|---|---|---|---|---|---|---|---|---|---|---|---|
| 19:00 | NEWS XXX | DRAMA XXXX | XX LESSON | PRO. BASEBALL REGULAR GAME X-Y | QUIZ AAAA | MOVIE A | MOVIE A | MOVIE A | | | |
| 20:00 | POPULAR SONG XXXX | REPORT YY | YY LESSON | | | | | | GOLF XX OPEN | GOLF XX OPEN | GOLF XX OPEN |
| 21:00 | X-DAY DRAMA | SOCCER XX PRELIMINARY | ZZ LESSON | DRAMA YYYY | NEWS ZZZ | MOVIE B | MOVIE B | MOVIE B | DRAMA ZZZZ | DRAMA ZZZZ | DRAMA ZZZZ |
| | | | AA LESSON | NEWS YYY | DRAMA AAAA | | | | | | |
| 23:00 | | | | | | | | | | | |

FIG.22

| ADDRESS | VIRTUAL CHANNEL NUMBER |
|---|---|
| 0x100 | 2 |
| 0x110 | 5 |
| 0x120 | 7 |
| 0x130 | 8 |
| 0x140 | 9 |
| 0x150 | 18-1 |
| 0x160 | 18-2 |
| 0x170 | 18-3 |
| 0x180 | 26-1 |
| 0x190 | 26-2 |
| 0x1A0 | 26-3 |

FIG.23

| ADDRESS | VIRTUAL CHANNEL NUMBER | PHYSICAL CHANNEL NUMBER | ANALOG/ DIGITAL | PREVIOUS CHANNEL ADDRESS | NEXT CHANNEL ADDRESS | LEADING CHANNEL |
|---|---|---|---|---|---|---|
| 0x00 | 2 | 2 | ANALOG | 0xB0 | 0x10 | S |
| 0x10 | 5 | 5 | ANALOG | 0x00 | 0x20 | |
| 0x20 | 7 | 7 | ANALOG | 0x10 | 0x40 | |
| 0x30 | 8 | 8 | ANALOG | 0x20 | 0x40 | |
| 0x40 | 8-1 | 3 | DIGITAL | 0x20 | 0x70 | |
| 0x50 | 8-2 | 3 | DIGITAL | 0x40 | 0x60 | |
| 0x60 | 8-3 | 3 | DIGITAL | 0x50 | 0x70 | |
| 0x70 | 9 | 9 | ANALOG | 0x40 | 0x80 | |
| 0x80 | 18-1 | 6 | DIGITAL | 0x70 | 0xB0 | |
| 0x90 | 18-2 | 6 | DIGITAL | 0x80 | 0xA0 | |
| 0xA0 | 18-3 | 6 | DIGITAL | 0x90 | 0xB0 | |
| 0xB0 | 26-1 | 4 | DIGITAL | 0x80 | 0x00 | |
| 0xC0 | 26-2 | 4 | DIGITAL | 0xB0 | 0xD0 | |
| 0xD0 | 26-3 | 4 | DIGITAL | 0xC0 | 0x00 | |

| CHANNEL | 2 | 5 | 7 | 8-1 | 9 | 18-1 | 26-1 |
|---|---|---|---|---|---|---|---|
| 19:00 | NEWS XXX | DRAMA XXXX | XX LESSON | PRO. BASEBALL REGULAR GAME X-Y | QUIZ AAAA | MOVIE A | GOLF XX OPEN |
| 20:00 | POPULAR SONG XXXX | | YY LESSON | | | | |
| | | REPORT YY | | | | | |
| 21:00 | X-DAY DRAMA | SOCCER XX PRELIMINARY | ZZ LESSON | DRAMA YYYY | NEWS ZZZ | MOVIE B | DRAMA ZZZZ |
| | | | AA LESSON | NEWS YYY | DRAMA AAAA | | |
| 23:00 | | | | | | | |

| ADDRESS | VIRTUAL CHANNEL NUMBER |
|---|---|
| 0x100 | 2 |
| 0x110 | 5 |
| 0x120 | 7 |
| 0x130 | 8-1 |
| 0x140 | 9 |
| 0x150 | 18-1 |
| 0x160 | 26-1 |

FIG.27

| ADDRESS | VIRTUAL CHANNEL NUMBER | PHYSICAL CHANNEL NUMBER | ANALOG/ DIGITAL | PREVIOUS CHANNEL ADDRESS | NEXT CHANNEL ADDRESS | LEADING CHANNEL |
|---|---|---|---|---|---|---|
| 0x00 | 2 | 2 | ANALOG | 0xD0 | 0x10 | S |
| 0x10 | 5 | 5 | ANALOG | 0x00 | 0x20 | |
| 0x20 | 7 | 7 | ANALOG | 0x10 | 0x30 | |
| 0x30 | 8 | 8 | ANALOG | 0x20 | 0x70 | |
| 0x40 | 8-1 | 3 | DIGITAL | 0x70 | 0x50 | |
| 0x50 | 8-2 | 3 | DIGITAL | 0x40 | 0x60 | |
| 0x60 | 8-3 | 3 | DIGITAL | 0x50 | 0x80 | |
| 0x70 | 9 | 9 | ANALOG | 0x30 | 0x40 | |
| 0x80 | 18-1 | 6 | DIGITAL | 0x60 | 0x90 | |
| 0x90 | 18-2 | 6 | DIGITAL | 0x80 | 0xA0 | |
| 0xA0 | 18-3 | 6 | DIGITAL | 0x90 | 0xB0 | |
| 0xB0 | 26-1 | 4 | DIGITAL | 0xA0 | 0xC0 | |
| 0xC0 | 26-2 | 4 | DIGITAL | 0xB0 | 0xD0 | |
| 0xD0 | 26-3 | 4 | DIGITAL | 0xC0 | 0x00 | |

FIG.29

| CHANNEL | 2 | 5 | 7 | 8 | 9 | 8-1 | 8-2 | 8-3 | 18-1 | 18-2 | 18-3 | 26-1 | 26-2 | 26-3 |
|---|---|---|---|---|---|---|---|---|---|---|---|---|---|---|
| 19:00 | NEWS XXX | DRAMA XXXX | XX LESSON | PRO. BASEBALL REGULAR GAME X-Y | QUIZ AAAA | PRO. BASEBALL REGULAR GAME X-Y | PRO. BASEBALL REGULAR GAME X-Y | PRO. BASEBALL REGULAR GAME X-Y | MOVIE A | MOVIE A | MOVIE A | GOLF XX OPEN | GOLF XX OPEN | GOLF XX OPEN |
| 20:00 | POPULAR SONG XXXX | REPORT YY | YY LESSON | | | | | | | | | | | |
| 21:00 | X-DAY DRAMA | SOCCER XX PRELIMINARY | ZZ LESSON | DRAMA YYYY | NEWS ZZZ | DRAMA YYYY | DRAMA YYYY | DRAMA YYYY | MOVIE B | MOVIE B | MOVIE B | DRAMA ZZZZ | DRAMA ZZZZ | DRAMA ZZZZ |
| | | | AA LESSON | | DRAMA AAAA | | | | | | | | | |
| 23:00 | | | | NEWS YYY | | NEWS YYY | NEWS YYY | NEWS YYY | | | | | | |

FIG.30

| ADDRESS | VIRTUAL CHANNEL NUMBER |
|---|---|
| 0x100 | 2 |
| 0x110 | 5 |
| 0x120 | 7 |
| 0x130 | 8 |
| 0x140 | 9 |
| 0x150 | 8-1 |
| 0x160 | 8-2 |
| 0x170 | 8-3 |
| 0x180 | 18-1 |
| 0x190 | 18-2 |
| 0x1A0 | 18-3 |
| 0x1B0 | 26-1 |
| 0x1C0 | 26-2 |
| 0x1D0 | 26-3 |

FIG.31

| ADDRESS | VIRTUAL CHANNEL NUMBER | PHYSICAL CHANNEL NUMBER | ANALOG/ DIGITAL | PREVIOUS CHANNEL ADDRESS | NEXT CHANNEL ADDRESS | LEADING CHANNEL |
|---|---|---|---|---|---|---|
| 0x00 | 2 | 2 | ANALOG | 0xD0 | 0x10 | |
| 0x10 | 5 | 5 | ANALOG | 0x00 | 0x20 | |
| 0x20 | 7 | 7 | ANALOG | 0x10 | 0x30 | |
| 0x30 | 8 | 8 | ANALOG | 0x20 | 0x70 | |
| 0x40 | 8-1 | 3 | DIGITAL | 0x70 | 0x50 | S |
| 0x50 | 8-2 | 3 | DIGITAL | 0x40 | 0x60 | |
| 0x60 | 8-3 | 3 | DIGITAL | 0x50 | 0x80 | |
| 0x70 | 9 | 9 | ANALOG | 0x30 | 0x40 | |
| 0x80 | 18-1 | 6 | DIGITAL | 0x60 | 0x90 | |
| 0x90 | 18-2 | 6 | DIGITAL | 0x80 | 0xA0 | |
| 0xA0 | 18-3 | 6 | DIGITAL | 0x90 | 0xB0 | |
| 0xB0 | 26-1 | 4 | DIGITAL | 0xA0 | 0xC0 | |
| 0xC0 | 26-2 | 4 | DIGITAL | 0xB0 | 0xD0 | |
| 0xD0 | 26-3 | 4 | DIGITAL | 0xC0 | 0x00 | |

FIG.33

| CHANNEL | 8-1 | 8-2 | 8-3 | 18-1 | 18-2 | 18-3 | 26-1 | 26-2 | 26-3 | 2 | 5 | 7 | 8 | 9 |
|---|---|---|---|---|---|---|---|---|---|---|---|---|---|---|
| 19:00 | PRO. BASEBALL REGULAR GAME X-Y | PRO. BASEBALL REGULAR GAME X-Y | PRO. BASEBALL REGULAR GAME X-Y | MOVIE A | MOVIE A | MOVIE A | | | | NEWS XXX | DRAMA XXXX | XX LESSON | PRO. BASEBALL REGULAR GAME X-Y | QUIZ AAAA |
| 20:00 | | | | | | | GOLF XX OPEN | GOLF XX OPEN | GOLF XX OPEN | POPULAR SONG XXXX | REPORT YY | YY LESSON | | |
| 21:00 | DRAMA YYYY | DRAMA YYYY | DRAMA YYYY | MOVIE B | MOVIE B | MOVIE B | DRAMA ZZZZ | DRAMA ZZZZ | DRAMA ZZZZ | X-DAY DRAMA | SOCCER XX PRELIMINARY | ZZ LESSON | DRAMA YYYY | NEWS ZZZ |
| 23:00 | NEWS YYY | NEWS YYY | NEWS YYY | | | | | | | | | AA LESSON | NEWS YYY | DRAMA AAAA |

FIG.34

| ADDRESS | VIRTUAL CHANNEL NUMBER |
|---|---|
| 0x100 | 8-1 |
| 0x110 | 8-2 |
| 0x120 | 8-3 |
| 0x130 | 18-1 |
| 0x140 | 18-2 |
| 0x150 | 18-3 |
| 0x160 | 26-1 |
| 0x170 | 26-2 |
| 0x180 | 26-3 |
| 0x190 | 2 |
| 0x1A0 | 5 |
| 0x1B0 | 7 |
| 0x1C0 | 8 |
| 0x1D0 | 9 |

FIG.35

| ADDRESS | VIRTUAL CHANNEL NUMBER | PHYSICAL CHANNEL NUMBER | ANALOG/ DIGITAL | PREVIOUS CHANNEL ADDRESS | NEXT CHANNEL ADDRESS | LEADING CHANNEL |
|---|---|---|---|---|---|---|
| 0x00 | 2 | 2 | ANALOG | 0xA0 | 0x10 | S |
| 0x10 | 5 | 5 | ANALOG | 0x00 | 0x20 | |
| 0x20 | 7 | 7 | ANALOG | 0x10 | 0x30 | |
| 0x30 | 8 | 8 | ANALOG | 0x20 | 0x40 | |
| 0x40 | 8-1 | 3 | DIGITAL | 0x30 | 0x70 | |
| 0x50 | 8-2 | 3 | DIGITAL | 0x40 | 0x60 | |
| 0x60 | 8-3 | 3 | DIGITAL | 0x50 | 0x70 | |
| 0x70 | 9 | 9 | ANALOG | 0x40 | 0x80 | |
| 0x80 | 18-1 | 6 | DIGITAL | 0x70 | 0xB0 | |
| 0x90 | 18-2 | 6 | DIGITAL | 0x80 | 0xA0 | |
| 0xA0 | 18-3 | 6 | DIGITAL | 0x90 | 0xB0 | |
| 0xB0 | 26-1 | 4 | DIGITAL | 0x80 | 0x00 | |
| 0xC0 | 26-2 | 4 | DIGITAL | 0xB0 | 0xD0 | |
| 0xD0 | 26-3 | 4 | DIGITAL | 0xC0 | 0x00 | |

| CHANNEL | 2 | 5 | 7 | 8 | 8-1 | 9 | 18-1 | 26-1 |
|---|---|---|---|---|---|---|---|---|
| 19:00 | NEWS XXX | DRAMA XXXX | XX LESSON | PRO. BASEBALL REGULAR GAME X-Y | PRO. BASEBALL REGULAR GAME X-Y | QUIZ AAAA | MOVIE A | GOLF XX OPEN |
| 20:00 | POPULAR SONG XXXX | REPORT YY | YY LESSON | | | | | |
| 21:00 | X-DAY DRAMA | SOCCER XX PRELIMINARY | ZZ LESSON | DRAMA YYYY | DRAMA YYYY | NEWS ZZZ | MOVIE B | DRAMA ZZZZ |
| | | | AA LESSON | NEWS YYY | NEWS YYY | DRAMA AAAA | | |
| 23:00 | | | | | | | | |

FIG.38

| ADDRESS | VIRTUAL CHANNEL NUMBER |
|---|---|
| 0x100 | 2 |
| 0x110 | 5 |
| 0x120 | 7 |
| 0x130 | 8 |
| 0x140 | 8-1 |
| 0x150 | 9 |
| 0x160 | 18-1 |
| 0x170 | 26-1 |

FIG.40

| VIRTUAL CHANNEL NUMBER | COUNT |
|---|---|
| 2 | 112 |
| 5 | 359 |
| 7 | 75 |
| 8 | 256 |
| 8-1 | 412 |
| 8-2 | 39 |
| 8-3 | 43 |
| 9 | 155 |
| 18-1 | 51 |
| 18-2 | 33 |
| 18-3 | 25 |
| 26-1 | 55 |
| 26-2 | 7 |
| 26-3 | 0 |

FIG.41

| ADDRESS | VIRTUAL CHANNEL NUMBER | PHYSICAL CHANNEL NUMBER | ANALOG/ DIGITAL | PREVIOUS CHANNEL ADDRESS | NEXT CHANNEL ADDRESS | LEADING CHANNEL |
|---|---|---|---|---|---|---|
| 0x00 | 2 | 2 | ANALOG | 0x70 | 0x20 | |
| 0x10 | 5 | 5 | ANALOG | 0x40 | 0x30 | |
| 0x20 | 7 | 7 | ANALOG | 0x00 | 0xB0 | |
| 0x30 | 8 | 8 | ANALOG | 0x10 | 0x70 | |
| 0x40 | 8-1 | 3 | DIGITAL | 0xD0 | 0x10 | S |
| 0x50 | 8-2 | 3 | DIGITAL | 0x60 | 0x90 | |
| 0x60 | 8-3 | 3 | DIGITAL | 0x80 | 0x50 | |
| 0x70 | 9 | 9 | ANALOG | 0x30 | 0x00 | |
| 0x80 | 18-1 | 6 | DIGITAL | 0xB0 | 0x60 | |
| 0x90 | 18-2 | 6 | DIGITAL | 0x50 | 0xA0 | |
| 0xA0 | 18-3 | 6 | DIGITAL | 0x90 | 0xC0 | |
| 0xB0 | 26-1 | 4 | DIGITAL | 0x20 | 0x80 | |
| 0xC0 | 26-2 | 4 | DIGITAL | 0xA0 | 0xD0 | |
| 0xD0 | 26-3 | 4 | DIGITAL | 0xC0 | 0x40 | |

FIG.43

| CHANNEL | 8-1 | 5 | 8 | 9 | 2 | 7 | 26-1 | 18-1 | 8-3 | 8-2 | 18-2 | 18-3 | 26-2 | 26-3 |
|---|---|---|---|---|---|---|---|---|---|---|---|---|---|---|
| 19:00 | PRO. BASEBALL REGULAR GAME X-Y | DRAMA XXXX | PRO. BASEBALL REGULAR GAME X-Y | QUIZ AAAA | NEWS XXX | XX LESSON | GOLF XX OPEN | MOVIE A | PRO. BASEBALL REGULAR GAME X-Y | PRO. BASEBALL REGULAR GAME X-Y | MOVIE A | MOVIE A | GOLF XX OPEN | GOLF XX OPEN |
| 20:00 | | REPORT YY | | | POPULAR SONG XXXX | YY LESSON | | | | | | | | |
| 21:00 | DRAMA YYYY | SOCCER XX PRELIMINARY | DRAMA YYYY | NEWS ZZZ | X-DAY DRAMA | ZZ LESSON | DRAMA ZZZZ | MOVIE B | DRAMA YYYY | DRAMA YYYY | MOVIE B | MOVIE B | DRAMA ZZZZ | DRAMA ZZZZ |
| | | | | DRAMA AAAA | | AA LESSON | | | | | | | | |
| 23:00 | NEWS YYY | | NEWS YYY | | | | | | NEWS YYY | NEWS YYY | | | | |

FIG.44

| ADDRESS | VIRTUAL CHANNEL NUMBER |
|---|---|
| 0x100 | 8-1 |
| 0x110 | 5 |
| 0x120 | 8 |
| 0x130 | 9 |
| 0x140 | 2 |
| 0x150 | 7 |
| 0x160 | 26-1 |
| 0x170 | 18-1 |
| 0x180 | 8-3 |
| 0x190 | 8-2 |
| 0x1A0 | 18-2 |
| 0x1B0 | 18-3 |
| 0x1C0 | 26-2 |
| 0x1D0 | 26-3 |

| VIRTUAL CHANNEL NUMBER | COUNT |
|---|---|
| 5 | 47 |
| 7 | 21 |
| 8 | 243 |
| 8-1 | 6 |
| 8-2 | 0 |
| 8-3 | 1 |
| 9 | 87 |
| 18-1 | 61 |
| 18-2 | 154 |
| 18-3 | 99 |
| 26-1 | 222 |
| 26-2 | 11 |
| 26-3 | 43 |

(b)

| VIRTUAL CHANNEL NUMBER | COUNT |
|---|---|
| 2 | 76 |
| 7 | 19 |
| 8 | 87 |
| 8-1 | 111 |
| 8-2 | 0 |
| 8-3 | 43 |
| 9 | 7 |
| 18-1 | 21 |
| 18-2 | 245 |
| 18-3 | 33 |
| 26-1 | 154 |
| 26-2 | 53 |
| 26-3 | 20 |

FIG.47

| ADDRESS | VIRTUAL CHANNEL NUMBER | PHYSICAL CHANNEL NUMBER | ANALOG/ DIGITAL | CURRENT CHANNEL IS "2" | | CURRENT CHANNEL IS "5" | | ... | LEADING CHANNEL |
| --- | --- | --- | --- | --- | --- | --- | --- | --- | --- |
| | | | | PREVIOUS CHANNEL ADDRESS | NEXT CHANNEL ADDRESS | PREVIOUS CHANNEL ADDRESS | NEXT CHANNEL ADDRESS | | |
| 0x00 | 2 | 2 | ANALOG | 0x50 | 0x30 | 0x30 | 0xC0 | ... | S |
| 0x10 | 5 | 5 | ANALOG | 0x80 | 0xD0 | 0x50 | 0x90 | ... | |
| 0x20 | 7 | 7 | ANALOG | 0xD0 | 0xC0 | 0xD0 | 0x70 | ... | |
| 0x30 | 8 | 8 | ANALOG | 0x00 | 0xB0 | 0x40 | 0x00 | ... | |
| 0x40 | 8-1 | 3 | DIGITAL | 0xC0 | 0x60 | 0xB0 | 0x30 | ... | |
| 0x50 | 8-2 | 3 | DIGITAL | 0x60 | 0x00 | 0x70 | 0x10 | ... | |
| 0x60 | 8-3 | 3 | DIGITAL | 0x40 | 0x50 | 0xC0 | 0xA0 | ... | |
| 0x70 | 9 | 9 | ANALOG | 0xA0 | 0x80 | 0x20 | 0x50 | ... | |
| 0x80 | 18-1 | 6 | DIGITAL | 0x70 | 0x10 | 0xA0 | 0xD0 | ... | |
| 0x90 | 18-2 | 6 | DIGITAL | 0xB0 | 0xA0 | 0x10 | 0xB0 | ... | |
| 0xA0 | 18-3 | 6 | DIGITAL | 0x90 | 0x70 | 0x60 | 0x80 | ... | |
| 0xB0 | 26-1 | 4 | DIGITAL | 0x30 | 0x90 | 0x90 | 0x40 | ... | |
| 0xC0 | 26-2 | 4 | DIGITAL | 0x20 | 0x40 | 0x00 | 0x60 | ... | |
| 0xD0 | 26-3 | 4 | DIGITAL | 0x10 | 0x20 | 0x80 | 0x20 | ... | |

| CHANNEL | 2 | 8 | 26-1 | 18-2 | 18-3 | 9 | 18-1 | 5 | 26-3 | 7 | 26-2 | 8-1 | 8-3 | 8-2 |
|---|---|---|---|---|---|---|---|---|---|---|---|---|---|---|
| 19:00 | NEWS XXX | PRO. BASEBALL REGULAR GAME X-Y | GOLF XX OPEN | MOVIE A | MOVIE A | QUIZ AAAA | MOVIE A | DRAMA XXXX | GOLF XX OPEN | XX LESSON | GOLF XX OPEN | PRO. BASEBALL REGULAR GAME X-Y | PRO. BASEBALL REGULAR GAME X-Y | PRO. BASEBALL REGULAR GAME X-Y |
| 20:00 | POPULAR SONG XXXX | | | | | | | REPORT YY | | YY LESSON | | | | |
| | | | | | | NEWS ZZZ | | | | ZZ LESSON | | | | |
| 21:00 | X-DAY DRAMA | DRAMA YYYY | DRAMA ZZZZ | MOVIE B | MOVIE B | DRAMA AAAA | MOVIE B | SOCCER XX PRELIMINARY | DRAMA ZZZZ | AA LESSON | DRAMA ZZZZ | DRAMA YYYY | DRAMA YYYY | DRAMA YYYY |
| | | NEWS YYY | | | | | | | | | | NEWS YYY | NEWS YYY | NEWS YYY |
| 23:00 | | | | | | | | | | | | | | |

(b)

| CHANNEL | 5 | 18-2 | 26-1 | 8 | 2 | 18-1 | 26-2 | 8-3 | 18-3 | 7 | 26-3 | 8-1 | 9 | 8-2 |
|---|---|---|---|---|---|---|---|---|---|---|---|---|---|---|
| 19:00 | DRAMA XXXX | MOVIE A | GOLF XX OPEN | PRO. BASEBALL REGULAR GAME X-Y | NEWS XXX | GOLF XX OPEN | GOLF XX OPEN | PRO. BASEBALL REGULAR GAME X-Y | MOVIE A | XX LESSON | GOLF XX OPEN | PRO. BASEBALL REGULAR GAME X-Y | QUIZ AAAA | PRO. BASEBALL REGULAR GAME X-Y |
| 20:00 | REPORT YY | | | | POPULAR SONG XXXX | | | | | YY LESSON | | | NEWS ZZZ | |
| | | | | | | | | | | ZZ LESSON | | | | DRAMA YYYY |
| 21:00 | SOCCER XX PRELIMINARY | MOVIE B | DRAMA ZZZZ | DRAMA YYYY | X-DAY DRAMA | DRAMA ZZZZ | DRAMA ZZZZ | DRAMA YYYY | MOVIE B | AA LESSON | DRAMA ZZZZ | DRAMA YYYY | DRAMA AAAA | NEWS YYY |
| | | | | NEWS YYY | | | | NEWS YYY | | | | NEWS YYY | | |
| 23:00 | | | | | | | | | | | | | | |

| ADDRESS | CURRENT CHANNEL IS "2" VIRTUAL CHANNEL NUMBER |
|---|---|
| 0x100 | 8 |
| 0x110 | 26-1 |
| 0x120 | 18-2 |
| 0x130 | 18-3 |
| 0x140 | 9 |
| 0x150 | 18-1 |
| 0x160 | 5 |
| 0x170 | 26-3 |
| 0x180 | 7 |
| 0x190 | 26-2 |
| 0x1A0 | 8-1 |
| 0x1B0 | 8-3 |
| 0x1C0 | 8-2 |

(b)

| ADDRESS | CURRENT CHANNEL IS "5" VIRTUAL CHANNEL NUMBER |
|---|---|
| 0x200 | 18-2 |
| 0x210 | 26-1 |
| 0x220 | 8-1 |
| 0x230 | 8 |
| 0x240 | 2 |
| 0x250 | 26-2 |
| 0x260 | 8-3 |
| 0x270 | 18-3 |
| 0x280 | 18-1 |
| 0x290 | 26-3 |
| 0x2A0 | 7 |
| 0x2B0 | 9 |
| 0x2C0 | 8-2 |

BROADCAST RECEIVING DEVICE AND PROGRAM SELECTING METHOD

RELATED APPLICATIONS

This application is the U.S. National Phase under 35 U.S.C. §371 of International Application No. PCT/JP2007/051137, filed on Jan. 25, 2007, the disclosure of which Application is incorporated by reference herein.

TECHNICAL FIELD

The present invention relates to a broadcast receiving device and a program selecting method, and particularly to a broadcast receiving device and a program selecting method that select programs by operating forward/reverse selection operations or using an electronic program guide.

BACKGROUND ART

In television broadcast, available frequency bands of carrier waves and available channel numbers are determined according to public rules, independently of kinds of analog and digital. These are referred to as "physical channels". In Japan, VHF (Very-High Frequency) and UHF (Ultra-High Frequency) bands are assigned to the ordinary analog broadcast, and the UHF band is assigned to the digital terrestrial broadcast. As the digital broadcast has started, program contents that are substantially the same as those provided by the conventional analog broadcast have also been provided on the digital channel. However, the assigned physical channel number of the digital broadcast is different from that of the analog broadcast so that the analog broadcast and the digital broadcast use different channel numbers for the program of the same broadcast station and the same contents, respectively. Accordingly, such a system has been employed that the digital broadcast employs a virtual channel number apart from the physical channel number, and the channel number equal to that of the corresponding analog broadcast program can also assigned to the program. Further, in the digital broadcast, a plurality of sub-channels can be assigned to one channel. Thereby, it is possible, e.g., to broadcast a baseball game on different sub-channels on which different commentators appear, respectively. Since this virtual channel number is described in a data field representing the virtual channel in data of the digital broadcast, the virtual channel number can be recognized by correctly receiving the digital broadcast data. Although a concept of the virtual channel is not employed for the analog broadcast, it may be regarded in some cases that the physical channel is the virtual channel.

In a past age of the analog broadcast, about ten channels at most are selected by depressing channel selection buttons bearing numbers "1"-"12". However, as the digital broadcast started, the number of channels has extremely increased, and nearly up to 100 channels including sub-channels are selectable. Therefore, a manner of selecting the channels by increment/decrement buttons has been an important factor in the channel selection, in addition to direct selection of an intended channel by a combination of channel number buttons.

In the broadcast wave, the frequency band of the carrier wave that each broadcast station (business entity) can use in each region or district is determined according to the public rules as already described. Also, the reach of the wave is also restricted. Therefore, in certain districts, the programs are not provided on all the physical channels, and there are many physical channels that are not used for the broadcast. When the user successively selects the physical channels containing many useless channels in a dispersed fashion by the increment/decrement buttons, the user must perform wasteful operations. Further, the channel allocation is not performed uniformly in all the districts, and depends on the district. Therefore, many television sets are configured as follows. In an operation of installing the television set, the television set once attempts to receive programs on all the physical channels, stores information about the available channels, i.e., channels allowing the program reception in a memory (e.g., a data memory of a control microcomputer), and allows successive selection of only the available channels through the increment/decrement buttons according to the information. When the channel map in the memory is created in order of physical channels, the channel selected by the increment/decrement buttons is successively displayed in the order of the physical channels. When the channel map is stored in order of virtual addresses, the channel selected by the increment/decrement buttons is successively displayed in the order of the virtual channels.

Since the digital broadcast started, many television sets are provided with a configuration in which an electronic program guide for several channels is displayed on one screen, and right/left/up/down buttons can be operated to select a desired program in the guide for watching or unattended recording. For this, the television set extracts the program information about respective channels from the received data in order of storage in the channel map, creates the electronic program guide based on the extracted data and displays it. In the electronic program guide, program titles on the respective channels are arranged from the left to the right in the order of storage in the channel map. On the screen, an image of a television program guide on a newspaper is displayed, the times are arranged vertically and the channels are arranged laterally. The laterally arranged channels can be selected by the left/right buttons in the order of storage in the channel map. Also, the time can be selected by the up/down buttons. However, only the information about several channels is displayed on the single screen. Therefore, when the right button is further depressed after the rightmost channel is selected, the electronic program guide of other channel(s) is displayed one program at a time or one screen image at a time.

DISCLOSURE OF THE INVENTION

Problems to be Solved by the Invention

In the prior art, however, the user cannot rapidly watch a desired program for the following reasons.

Although pre-search was performed to narrow a range, many channels are still present in the channel map, and it takes a long time for finding the desired program when programs are successively selected by the successive search using the increment/decrement buttons.

Further, when the broadcast changes from the analog to digital, and vice versa, setting values in a display device and others must be significantly changed for switching the display due to difference in resolution. When the channels of the analog broadcast and the channels of the digital broadcast are present in a mixed fashion in the channel map, a long time is required for the channel switching from the analog to digital and vice versa so that the time required for selecting the desired program further increases.

When the channel is selected in a manner linked to the electronic program guide, a long time is required for finding the desired program because programs on only several channels among those in the channel map are displayed on a screen.

Accordingly, an object of the invention is to provide a broadcast receiving device and a program selecting method that allow a user to watch rapidly a desired program Means for Solving the Problems An embodiment of the invention provides a broadcast receiving device described below. A tuner receives broadcast data of a designated channel. A search unit searches an available channel by controlling the tuner, and creates a channel map representing the available channels and a selection order of the same. A setting unit creates setting information defining enabling/disabling of the selection and/or change in the selection order for the channels in said channel map. An operation input unit accepts a user's operation of selecting the channel. A switching unit changes the selection of the channel according to the setting information when the user performs an operation of forwarding or reversing the channel through the operation input unit, and causing the tuner to receive the broadcast data on the selected channel.

Effects of the Invention

According to an embodiment, the invention allows the user to watch rapidly a desired program, and offers an effect of relieving a stress on the user in the channel selecting operation.

BRIEF DESCRIPTION OF THE DRAWINGS

FIG. 4 shows an example of a channel map created by channel search.

FIG. 6(a) shows an electronic program guide provided when the channel map of FIG. 4 is used, and (b) shows an electronic program guide provided when a displayed portion is changed from that in (a).

FIG. 7 shows an example of the changed channel map employed when the user provides an instruction to disable selection of a part of the channels.

FIG. 9 shows an electronic program guide provided when the channel map of FIG. 7 is used.

FIG. 10 shows an example of a working channel map that defines a channel selection order similar to that in the channel map of FIG. 7.

FIG. 11 shows an example of the changed channel map employed when the user provides an instruction for changing the channel selection order.

FIG. 13 shows an electronic program guide provided when the channel map of FIG. 11 is used.

FIG. 14 shows an example of a working channel map that defines a channel selection order similar to that in the channel map of FIG. 11.

FIG. 15 shows an example of the changed channel map employed when the user provides an instruction for disabling selection of a part of the channels and changing the channel selection order.

FIG. 17 shows an electronic program guide provided when the channel map of FIG. 15 is used.

FIG. 18 shows an example of the working channel map that defines a channel selection order similar to that in the channel map of FIG. 15.

FIG. 19 shows an example of the changed channel map employed when the same program can be received in both the digital broadcast and the analog broadcast, and the channel of the corresponding digital broadcast is disabled.

FIG. 21 shows an electronic program guide provided when the channel map of FIG. 19 is used.

FIG. 22 shows an example of the working channel map that defines a channel selection order similar to that in the channel map of FIG. 19.

FIG. 23 shows another example of the changed channel map employed when the same program can be received from both the digital broadcast and the analog broadcast, and the channel of the corresponding analog broadcast and sub-channels 2 and 3 of the corresponding digital broadcast are disabled.

FIG. 27 shows an example of the changed channel map employed when both the digital broadcast and the analog broadcast can be received.

FIG. 29 shows an electronic program guide provided when the channel map of FIG. 27 is used.

FIG. 30 shows an example of the working channel map that defines a channel selection order similar to that in the channel map of FIG. 27.

FIG. 31 shows another example of the changed channel map employed when both the digital broadcast and the analog broadcast can be received.

FIG. 33 shows an electronic program guide provided when the channel map of FIG. 31 is used.

FIG. 34 shows an example of the working channel map that defines a channel selection order similar to that in the channel map of FIG. 31.

FIG. 35 shows another example of the changed channel map employed when the digital broadcast having a plurality of sub-channels can be received.

FIG. 36 shows an order in which the channel selection moves when the channel map of FIG. 35 is used and the user depresses the increment/decrement buttons.

FIG. 37 shows an electronic program guide provided when the channel map of FIG. 35 is used.

FIG. 38 shows an example of the working channel map that defines a channel selection order similar to that in the channel map of FIG. 35.

FIG. 40 shows, by way of example, counts stored in a counter.

FIG. 41 shows, by way of example, the changed channel map employed when the counts in FIG. 40 are used.

FIG. 43 shows an electronic program guide provided when the channel map of FIG. 41 is used.

FIG. 44 shows an example of the working channel map that defines a channel selection order similar to that in the channel map of FIG. 41.

FIG. 46(a) shows, by way of example, a number that is stored in the counter and represents times of change of a watching channel from a channel "2" to other channels, and (b) shows the number of times of the change of the watching channel from a channel "5" to other channels.

FIG. 47 shows, by way of example, the changed channel map employed when the count takes values in FIGS. 46(a) and 46(b), respectively.

FIG. 49(a) shows an electronic program guide provided when the channel map of FIG. 47 is used and a channel "2" is a current watching channel, and FIG. 49(b) shows an electronic program guide provided when the channel map of FIG. 47 is used and a channel "5" is a current watching channel.

FIGS. 50(a) and 50(b) show, by way of example, working channel maps that define a channel selection order similar to that in the channel map of FIG. 47.

DESCRIPTION OF THE REFERENCE SIGNS 10, 110 and 210 program selecting unit; 11 channel search unit; 12 channel order setting unit; 13, 113 and 213 channel changing unit; 14 channel map storage unit; 15 program display unit; 20 antenna; 22 tuner; 24 video and audio data extracting unit; 26 image/sound output unit (which will be referred to as a "television set" hereinafter); 30 operation input unit, 32 remote control; 33 power button; 41 increment button; 42 decrement button; 34 photo-receiver; 36 channel number button; 43 left button; 44 right button; 45 up button; 46 down button; 100, 200 and 300 broadcast receiving device; 116 and 216 counter

BEST MODES FOR CARRYING OUT THE INVENTION

First Embodiment

Figure 1:
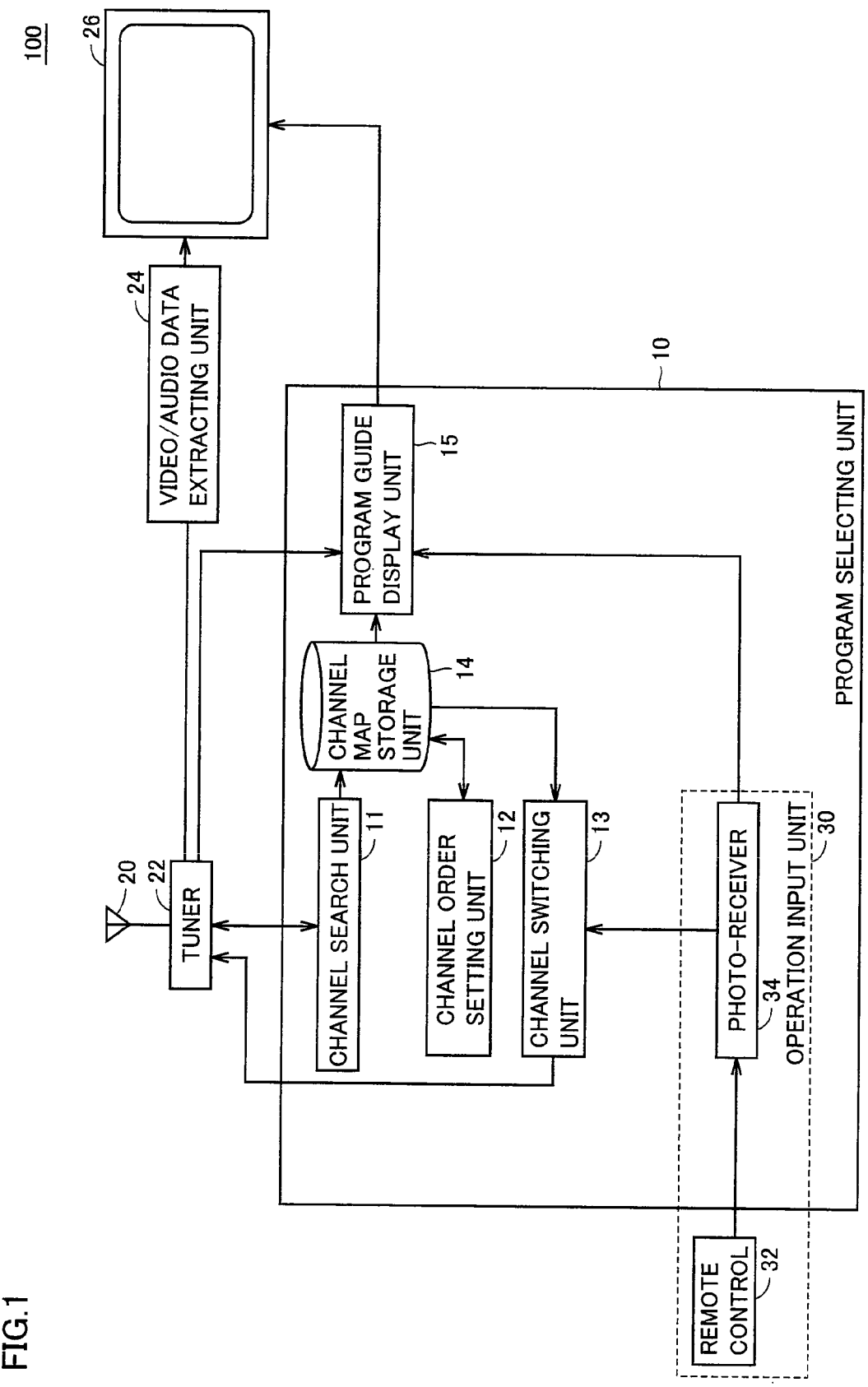
FIG. 1 shows a structure of a broadcast receiving device of a first embodiment.

FIG. 1 shows a structure of a broadcast receiving device of a first embodiment. Referring to FIG. 1, a broadcast receiving device 100 includes an antenna 20, a tuner 22, a video and audio data extracting unit 24, a program selecting unit 10, a remote control 32 and a television set 26. Program selecting unit 10 has a photo-receiver 34, a channel search unit 11, a channel map storage unit 14, a channel order setting unit 12, a channel switching unit 13 and a program guide display unit 15.

A remote control 32 and a photo-receiver 34 receiving a signal from remote control 32 form an operation input unit 34 accepting a user's operation for selecting a channel.

Figure 2:
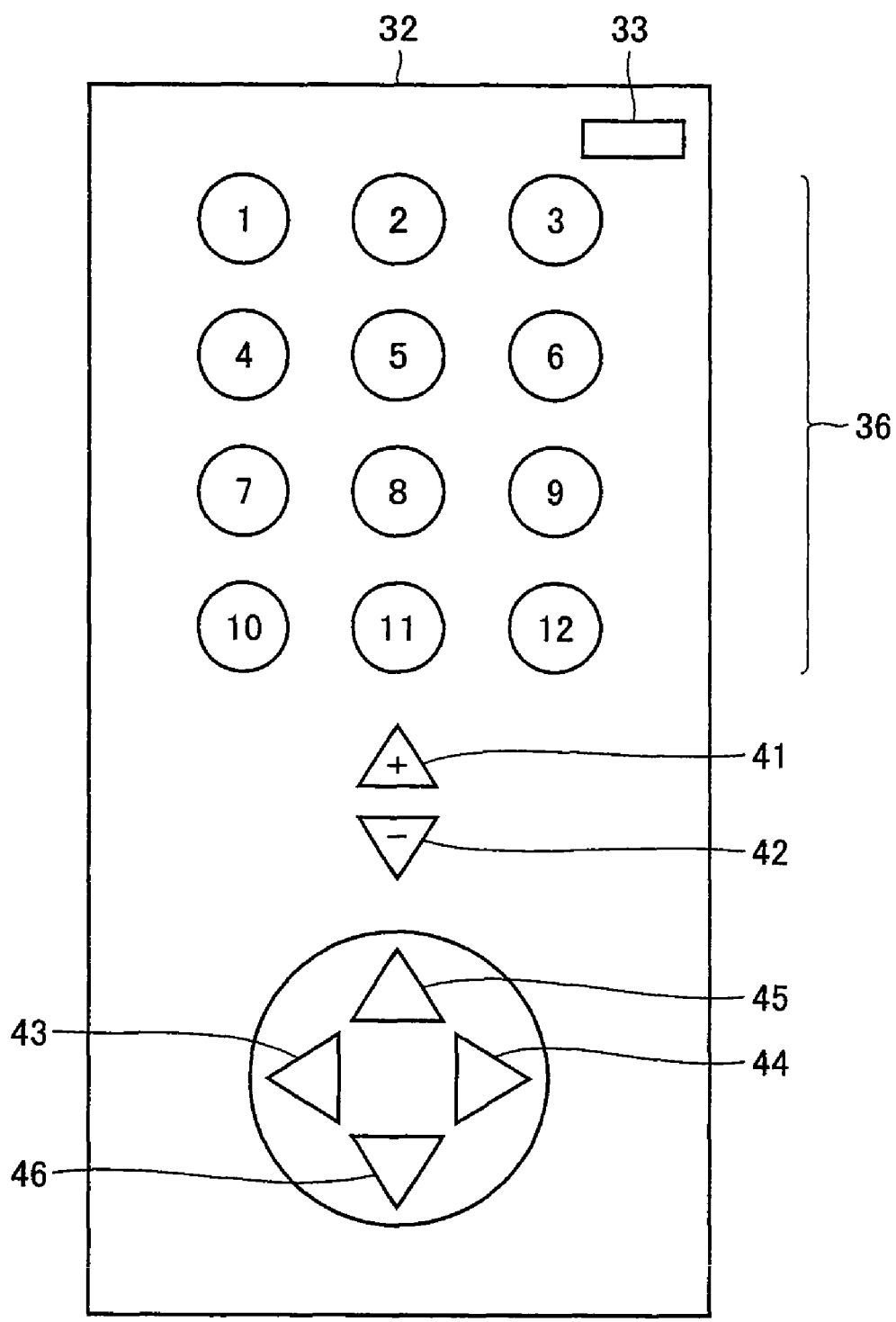
FIG. 2 shows buttons of a remote control.

FIG. 2 shows buttons of a remote control.

Referring to FIG. 2, a power button 33 is employed for turning on/off a power of the broadcast receiving device. Channel number buttons 36 are employed for selecting channels of numbers (virtual channel numbers in this example) on the respective buttons. An increment button 41 and a decrement button 42 are employed for selecting the channel by forwarding and reversing the channel, respectively.

Left, right, up and down buttons 43, 44, 45 and 46 are employed for moving a cursor on a displayed electronic program guide. For example, when a user depresses the left button, the cursor moves leftward to a next channel in the electronic program guide. When the user depresses the down button, the cursor moves downward to a next time band in the electronic program guide. When the user depresses a button that is not shown, tuning of the channel in the position of the cursor is performed or programming for recording the program on this channel is performed.

Antenna 20 receives a broadcast wave transmitted from a broadcast station.

Tuner 22 is tuned to the frequency of the designated channel, and receives the broadcast data on the designated channel from the broadcast wave. Although at least two kinds of tuners 22 are required for receiving both the analog and digital broadcasts, these are described as one tuner for the sake of simplicity. Tuner 22 receives program information about the broadcast programs. The broadcast information includes a date, channel, day of week, start time, end time, kind of program, program title and the like.

Video and audio data extracting unit 24 extracts the video and audio data from the broadcast data received by tuner 22 so that television set 26 can output the pictures and sounds.

Channel search unit 11 controls tuner 22 to search for available channels (i.e., channels on which broadcast data can be received), creates the channel map representing the available channels and the selection order thereof, and stores it in channel map storage unit 14.

Channel map storage unit 14 stores the channel map created by channel search unit 11. Information about each channel in the channel map is formed of a virtual channel number, a physical channel number, a type indicating the analog or digital broadcast, an address of a previous channel, an address of a next channel and a flag S indicating a first or leading channel. The address of the previous channel represents an address in the channel map where information about the channel in an immediately preceding selection position according to the selection order is stored. The address of the next channel represents an address in the channel map where information about the channel in an immediately following selection position is stored. Channel order setting unit 12 changes the information in the channel map, and channel switching unit 13 reads it for the channel selection.

Channel order setting unit 12 performs the setting about the channels in the channel map stored in channel map storage unit 14 to enable or disable the selection and to change the selection order. In the first embodiment, channel order setting unit 12 disables the selection of a part of the channels in the channel map according to the instruction provided from the user via operation input unit 34.

When the user depresses the increment/decrement button, channel switching unit 13 changes the selection of the channel according to the channel map, and causes tuner 22 to receive the broadcast data on the selected channel. More specifically, when the user depresses the increment button, channel switching unit 13 accesses the information about the currently selected channel in the channel map to obtain the address of the next channel, accesses the obtained address of the next channel to obtain the virtual channel number (which will be merely referred to as a "channel number" hereinafter) and selects this next channel. When the user depresses the decrement button, channel switching unit 13 accesses the information about the currently selected channel in the channel map, obtains the address of the previous channel, accesses the obtained address to obtain the channel number, and selects the channel of the obtained number.

According to the program information received by tuner 22 and the channel map in channel map storage unit 14 that is changed by channel order setting unit 12, program guide display unit 15 creates and displays the electronic program guide in a table form relating to a part of the selectable channels which are consecutive in the order. The electronic program guide has a time base or axis in the longitudinal direction (in which the row changes) and a channel base or axis in the lateral direction (in which the column changes). Program guide display unit 15 displays a part of the selectable channels that are consecutive in the order such that these channels successively displayed in the direction (lateral direction) of the electronic program guide are aligned in the order of selection.

(Channel Selecting Operation)

Figure 3:
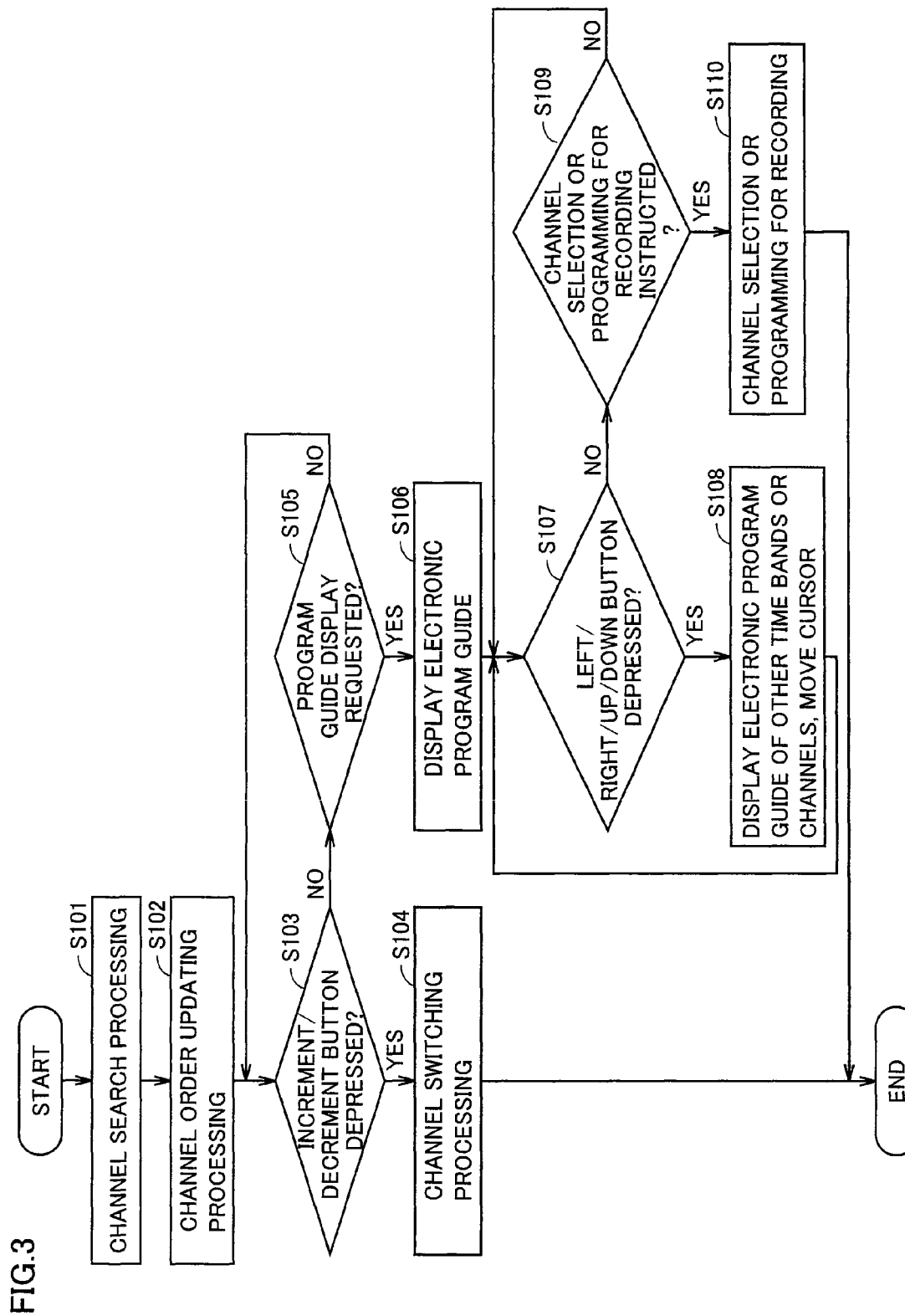
FIG. 3 is a flowchart illustrating a procedure of a channel selecting operation of the embodiment.

FIG. 3 is a flowchart illustrating a procedure of the channel selecting operation of the embodiment of the invention.

Referring to FIG. 3, channel search unit 11 controls tuner 22 to search for the available channels, creates the channel map representing the available channels and the selection order thereof, and stores it in channel map storage unit 14 (step S101).

Then, channel order setting unit 12 sets enabling/disabling of the selection and/or the selection order about the channels in the channel map (step S102).

When the user depresses the increment/decrement button (YES in step S103), channel switching unit 13 changes the selection of the channel according to the channel map, and causes tuner 22 to receive the broadcast data on the selected channel (step S104).

When the user depresses the button employed for instructing the display of the program guide (not shown) (YES in step S105), program guide display unit 15 displays the electronic program guide according to the received program information and the channel map (step S106).

When the user depresses the left/right/up/down buttons (YES in step S107), program guide display unit 15 moves the cursor or displays the electronic program guide about other channels or other time bands (step S108).

When the user depresses the button (not shown) to provide an instruction for watching the program in the electronic program guide or performing unattended recording (YES in step S109), program guide display unit 15 causes tuner 22 to receive the broadcast data on the program channel specified for watching, or programs it for the recording (step S110).

(Specific Examples of the Channel Map, Selection Order and Electronic Program Guide after the Channel Search)

FIG. 4 shows an example of the channel map created by the channel search. Referring to FIG. 4, the information about each channel is formed of the virtual channel number, the physical channel number, the type indicating the analog or digital broadcast, the address of the previous channel, the address of the next channel and flag S indicating the first channel.

The address represents the position in which the channel map stores the information about each channel. As shown in FIG. 4, information about the channels bearing smaller virtual channel numbers are stored in positions of smaller addresses. In FIG. 4, the address of the previous channel indicates the address of the channel bearing the immediately preceding virtual channel number, and the address of the next channel indicates the address of the channel bearing the immediately following virtual channel number. Therefore, when the channel map of FIG. 4 is used, the selection order of the channels is based on the virtual channel numbers.

Figure 5:
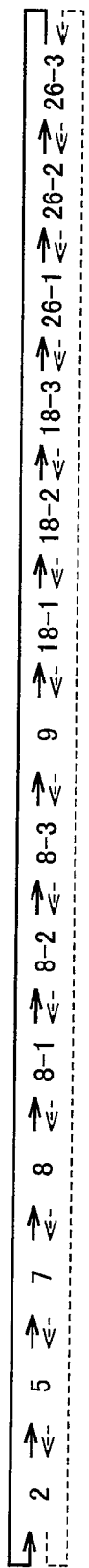
FIG. 5 shows an order in which channel selection moves when the channel map of FIG. 4 is used and a user depresses increment/decrement buttons.

FIG. 5 shows the order in which the channel selection moves when the channel map of FIG. 4 is used and the user depresses the increment/decrement buttons.

Referring to FIG. 5, when the user depresses the increment button, channel switching unit 13 moves the channel selection in the direction of solid line. When the user depresses the decrement button, channel switching unit 13 moves the channel selection in the direction of dotted line. For example, when the channel "2" is currently selected and the user depresses the increment button, channel switching unit 13 reads an address "0x10" of the next channel from the information about the channel "2" in the channel map shown in FIG. 4, specifies the channel number "5" stored at the address "0x10" and moves the selection to a channel "5". When the channel "2" is currently selected and the user depresses the decrement button, channel switching unit 13 reads an address "0xD0" of the previous channel from the information about the channel "2" in the channel map of FIG. 4, specifies the channel number "26-3" stored at the address "0xD0" and moves the selection to a channel "26-3".

FIG. 6(*a*) shows an electronic program guide provided when the channel map of FIG. 4 is used.

Referring to FIG. 6(*a*), program guide display unit 15 arranges, in the first column of the electronic program guide, the programs on the channel "2" that bears a leading channel flag S in the channel map of FIG. 4 and is in the first selection order. Program guide display unit 15 reads the address "0x10" of the next channel from the information about the channel "2" in the channel map of FIG. 4, specifies the channel number "5" stored at the address "0x10" and arranges, in the second column of the electronic program guide, the programs on the channel "5" that is in the second selection position. Likewise, it arranges, in the other columns, the programs on the channels in the selection positions corresponding to the respective columns.

As shown in FIG. 6(*a*), the electronic program guide may be displayed for all the channels in the channel map, and may also be displayed for only a part of the channels. For example, the electronic program guide may be displayed for only four channels that occupy the consecutive selection positions in the channel map.

Hatched portions in FIG. 6(*a*) represent the electronic program guide that is displayed in the initial state when the electronic program guide is configured to display only a part of the channels. In the initial state, the electronic program guide is displayed to show the hatched portion, i.e., first to fourth columns relating to the channels of the first to fourth positions in the selection order. Thereafter, the user can operate the right or left button to change the channels in the electronic program guide. For example, when the user operates the right button in FIG. 6(a) to move the cursor to the fourth column and then depresses the right button, the electronic program guide is displayed to show the second to fifth columns hatched in FIG. 6(b), i.e., the channels in the second to fifth selection positions. Also, the user can operate the up/down button to change the time band in the electronic program guide.

(Specific Examples of the Channel Map, Selection Order and Electronic Program Guide after the Setting of the Channel Order)

FIG. 7 shows an example of the changed channel map employed when the user provides an instruction for disabling the selection of a part of the channels.

Figure 8:
FIG. 8 shows an order in which the channel selection moves when the channel map of FIG. 7 is used and the user depresses the increment/decrement buttons.

FIG. 8 shows an order in which the channel selection moves when the channel map of FIG. 7 is used and the user depresses the increment/decrement buttons.

When the user operates the buttons (not shown) on remote control 32 to disable the selection of channels "8", "8-1", "8-2" and "8-3", channel order setting unit 12 rewrites the channel map as shown in FIG. 7. More specifically, channel order setting unit 12 sets an address "0x70" of the channel "9" as the address of the channel following the channel "7" so that the channel selection may skip channels "8", "8-1", "8-2" and "8-3" and may move to a channel "9" when the channel "7" is currently selected and the user selects the increment button. Channel order setting unit 12 sets an address "0x20" of the channel "7" as the address of the channel preceding the channel "9" so that the channel selection may skip channels "8-3", "8-2", "8-1" and "8" and may move to the channel "7" when the channel "9" is currently selected and the user selects the decrement button.

Channel switching unit 13 moves the channel selection in the order shown in FIG. 8 according to the updated channel map of FIG. 7. More specifically, when the user depresses the increment button, channel switching unit 13 moves the channel selection in the direction of solid line. When the user depresses the decrement button, channel switching unit 13 moves the channel selection in the direction of dotted line. For example, when the channel "7" is currently selected and the user depresses the increment button, channel switching unit 13 reads the address "0x70" of the next channel from the information about the channel "7" in the channel map shown in FIG. 7, specifies the channel number "9" stored at the address "0x70" and moves the selection to the channel "9". When the channel "9" is currently selected and the user depresses the decrement button, channel switching unit 13 reads the address "0x20" of the previous channel from the information about the channel "9" in the channel map of FIG. 7, specifies the channel number "7" stored at the address "0x20" and moves the selection to the channel "7".

FIG. 9 shows an electronic program guide provided when the channel map of FIG. 7 is used.

Referring to FIG. 9, program guide display unit 15 arranges, in the first column of the electronic program guide, titles of the programs on the channel "2" that bears leading channel flag S in the channel map of FIG. 7 and is in the first selection order. Program guide display unit 15 reads the address "0x10" of the next channel from the information about the channel "2" in the channel map of FIG. 7, specifies the channel number "5" stored at the address "0x10" and arranges, in the second column of the electronic program guide, the titles of the programs on the channel "5" that is in the second selection position. Likewise, it arranges, in the other columns, titles of the programs on the channels in the selection positions corresponding to the respective columns.

As shown in FIG. 9, the electronic program guide may be displayed for all the channels in the channel map, and may also be displayed for only a part of the channels. For example, the electronic program guide may be displayed for only four channels that occupy the consecutive selection positions in the channel map. The user can operate the right/left buttons to change the channel in the electronic program guide, and can operate the up/down buttons to change the time band in the electronic program guide.

According to the broadcast receiving device of the first embodiment, as described above, since channel selection can skip a part of the channels that are found by pre-search, only the favorite channels can be selected. This can be implemented by simple processing of merely rewriting the channel map so that it is not necessary to execute the pre-search again.

Modification of the First Embodiment

In the first embodiment, channel order setting unit 12 changes the channel map, and channel switching unit 13 switches the channel selection using the channel map. However, this is not restrictive. Channel order setting unit 12 may be configured to take the information about the selectable channels from the conventional channel map (i.e., a master) into a working channel map in the order of the selection, and channel switching unit 13 may switch the channel selection using the working channel map.

FIG. 10 shows an example of the working channel map defining the channel selection order similarly to the channel map of FIG. 7.

Referring to FIG. 10, the address represents a storage location of the information about each channel in the working channel map. As shown in FIG. 10, the information about the channel in an earlier selection position is stored in the position of a smaller address. The working channel map of FIG. 10 stores the information about the channels in the order of selection shown in FIG. 8.

When the user depresses the increment button, channel switching unit 13 selects, in the working channel map, the channel stored at the address immediately following the address where the information about the currently selected channel is stored. When the user depresses the decrement button, channel switching unit 13 selects the channel stored at the address immediately preceding the address where the information about the currently selected channel is stored.

Second Embodiment

In the second embodiment, channel order setting unit 12 changes the selection order of the selectable channels in the channel map according to an instruction provided from the user through operation input unit 34.

(Specific Examples of the Channel Map, Selection Order and Electronic Program Guide after the Setting of the Channel Order)

FIG. 11 shows an example of the changed channel map employed when the user provides an instruction for changing the channel selection order.

Figure 12:
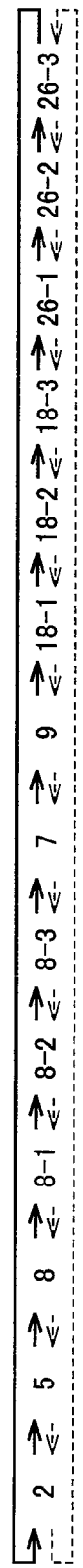
FIG. 12 shows an order in which the channel selection moves when the channel map of FIG. 11 is used and the user depresses the increment/decrement buttons.

FIG. 12 shows an order in which the channel selection moves when the channel map of FIG. 11 is used and the user depresses the increment/decrement buttons.

When the user operates the buttons (not shown) on remote control 32 to change the channel selection order such that the selection moves to the channel "8" after selecting the channel "5", and moves to the channel "7" after selecting the channel "8-3", channel order setting unit 12 rewrites the channel map as shown in FIG. 11.

Thus, channel order setting unit 12 sets an address "0x30" of the channel "8" as the address of the channel following the channel "5" so that the channel selection may move to the channel "8" when the channel "5" is currently selected and the increment button is selected. Also, channel order setting unit 12 sets the address "0x10" of the channel "5" as the address of the channel preceding the channel "8" so that the channel selection may move to the channel "5" when the channel "8" is currently selected and the decrement button is selected. Further, channel order setting unit 12 sets the address "0x20" of the channel "7" as the address of the channel following the channel "8-3" so that the channel selection may move to the channel "7" when the channel "8-3" is currently selected and the increment button is selected. Further, channel order setting unit 12 sets an address "0x60" of the channel "8-3" as the address of the channel preceding the channel "7" so that the channel selection may move to the channel "8-3" when the channel "7" is currently selected and the decrement button is selected. Further, channel order setting unit 12 sets the address "0x70" of the channel "9" as the address of the channel following the channel "7" so that the channel selection may move to the channel "9" when the channel "7" is currently selected and the decrement button is selected. Further, channel order setting unit 12 sets the address "0x20" of the channel "7" as the address of the channel preceding the channel "9" so that the channel selection may move to the channel "7" when the channel "9" is currently selected and the decrement button is selected.

Channel switching unit 13 moves the channel selection in the order shown in FIG. 12 according to the updated channel map of FIG. 11. Thus, when the user depresses the increment button, channel switching unit 13 moves the channel selection in the direction of solid line. When the user depresses the decrement button, it moves the channel selection in the direction of dotted line. For example, when the channel "5" is currently selected and the user depresses the increment button, channel switching unit 13 reads the address "0x30" of the next channel from the information about the channel "5" in the channel map of FIG. 11, specifies the channel number "8" stored at the address "0x30" and moves the selection to the channel "8". When the channel "8" is currently selected and the user depresses the decrement button, channel switching unit 13 reads the address "0x10" of the previous channel from the information about the channel "8" in the channel map of FIG. 11, specifies the channel number "5" stored at the address "0x10" and moves the selection to the channel "5".

FIG. 13 shows the electronic program guide provided when the channel map of FIG. 11 is used.

Referring to FIG. 13, program guide display unit 15 arranges, in the first column of the electronic program guide, the programs on the channel "2" that bears the leading channel flag S in the channel map of FIG. 11 and is in the first selection position. Program guide display unit 15 reads the address "0x10" of the next channel from the information about the channel "2" in the channel map of FIG. 11, specifies the channel number "5" stored at the address "0x10" and arranges, in the second column of the electronic program guide, the programs on the channel "5" that is in the second selection position. Likewise, it arranges, in the other columns, the programs on the channels in the selection positions corresponding to the respective columns.

As shown in FIG. 13, the electronic program guide may be displayed for all the channels in the channel map, and may also be displayed for only a part of the channels. For example, the electronic program guide may be displayed for only four channels that occupy the consecutive selection positions in the channel map. The user can operate the right/left buttons to change the channel in the electronic program guide, and can operate the up/down buttons to change the time band in the electronic program guide.

According to the broadcast receiving device of the second embodiment, as described above, since the selection order can be changed, the channels can be successively selected in descending order of possibility of the channel selection.

Modification of the Second Embodiment

In the second embodiment, the working channel map can be created instead of changing the channel map, and can be used for switching the channel selection, similarly to the modification of the first embodiment.

FIG. 14 shows an example of the working channel map that defines the channel selection order similar to that in the channel map of FIG. 11.

Referring to FIG. 14, the information items about the channels in earlier selection positions are stored at the smaller addresses. The working channel map of FIG. 14 stores the information about the channels in the order of selection shown in FIG. 12.

Third Embodiment

In a third embodiment, channel order setting unit 12 disables the selection of a part of the channels in the channel map and changes the selection order of the selectable channels in accordance with the instruction provided from the user via operation input unit 34.

(Specific Examples of the Channel Map, Selection Order and Electronic Program Guide after the Setting of the Channel Order)

FIG. 15 shows an example of the changed channel map employed when the user provides the instruction for disabling the selection of a part of the channels and changing the channel selection order.

Figure 16:
FIG. 16 shows an order in which the channel selection moves when the channel map of FIG. 15 is used and the user depresses the increment/decrement buttons.

FIG. 16 shows an order in which the channel selection moves when the channel map of FIG. 15 is used and the user depresses the increment/decrement buttons.

When the user operates the buttons (not shown) on remote control 32 to disable the selection of channels "8", "8-1", "8-2" and "8-3", and to change the channel selection order such that the channel selection moves to the channel "9" from the channel "5", then moves to the channel "7" and then moves to the channel "18-1", channel order setting unit 12 rewrites the channel map as shown in FIG. 13.

More specifically, channel order setting unit 12 sets the address "0x70" of the channel "9" as the address of the channel following the channel "5" so that the channel selection may move not to the channel "7" but to the channel "9" when the channel "5" is currently selected and the user selects the increment button. Channel order setting unit 12 sets the address "0x10" of the channel "5" as the address of the channel preceding the channel "9" so that the channel selection may move not to the channel "8-3" but to the channel "5" when the channel "9" is currently selected and the user selects the decrement button.

Further, channel order setting unit 12 sets the address "0x20" of the channel "7" as the address of the channel following the channel "9" so that the channel selection may move not to the channel "18-1" but to the channel "7" when the channel "9" is currently selected and the user selects the increment button. Channel order setting unit 12 sets the address "0x70" of the channel "9" as the address of the channel preceding the channel "7" so that the channel selection may move not to the channel "5" but to the channel "9" when the channel "7" is currently selected and the user selects the decrement button.

Further, channel order setting unit 12 sets an address "0x80" of the channel "18-1" as the address of the channel following the channel "7" so that the channel selection may move not to the channel "8" but to the channel "18-1" when the channel "7" is currently selected and the user selects the increment button. Channel order setting unit 12 sets the address "0x20" of the channel "7" as the address of the channel preceding the channel "18-1" so that the channel selection may move not to the channel "9" but to the channel "7" when the channel "18-1" is currently selected and the user selects the decrement button.

Channel switching unit 13 moves the channel selection in the order shown in FIG. 16 according to the updated channel map of FIG. 15. More specifically, when the user depresses the increment button, channel switching unit 13 moves the channel selection in the direction of solid line. When the user depresses the decrement button, channel switching unit 13 moves the channel selection in the direction of dotted line. For example, when the channel "5" is currently selected and the user depresses the increment button, channel switching unit 13 reads the address "0x70" of the next channel from the information about the channel "5" in the channel map of FIG. 15, specifies the channel number "9" stored at the address "0x70" and moves the selection to the channel "9". When the channel "9" is currently selected and the user depresses the decrement button, channel switching unit 13 reads the address "0x10" of the previous channel from the information about the channel "9" in the channel map of FIG. 15, specifies the channel number "5" stored at the address "0x10" and moves the selection to the channel "5".

FIG. 17 shows an electronic program guide provided when the channel map of FIG. 15 is used.

Referring to FIG. 17, program guide display unit 15 arranges, in the first column of the electronic program guide, the programs on the channel "2" that bears the leading channel flag S in the channel map of FIG. 15 and is in the first selection position. Program guide display unit 15 reads the address "0x10" of the next channel from the information about the channel "2" in the channel map of FIG. 15, specifies the channel number "5" stored at the address "0x10" and arranges, in the second column of the electronic program guide, the programs on the channel "5" that is in the second selection position. Likewise, it arranges, in the other columns, the programs on the channels in the selection positions corresponding to the respective columns.

As shown in FIG. 17, the electronic program guide may be displayed for all the channels in the channel map, and may also be displayed for only a part of the channels. For example, the electronic program guide may be displayed for only four channels that occupy the consecutive selection positions in the channel map. The user can operate the right/left buttons to change the channel in the electronic program guide, and can operate the up/down buttons to change the time band in the electronic program guide.

According to the broadcast receiving device of the third embodiment, as described above, since a part of the channels found by the pre-search can be skipped and the selection order can be changed, only the favorite channels can be successively selected in descending order of possibility of the channel selection.

Modification of the Third Embodiment

In the third embodiment, the working channel map can be created instead of changing the channel map, and can be used for switching the channel selection, similarly to the modification of the first embodiment.

FIG. 18 shows an example of the working channel map that defines the channel selection order similar to that in the channel map of FIG. 15.

Referring to FIG. 18, the information items about the channels in earlier selection positions are stored at the smaller addresses. The working channel map of FIG. 18 stores the information about the channels in the order of selection shown in FIG. 16.

Fourth Embodiment

In a fourth embodiment, when there is a channel on which the digital broadcast provides the same program same as that on a channel of the analog broadcast, channel order setting unit 12 rewrites the channel map so that this channel of the digital broadcast cannot be selected.

(Specific Examples of the Channel Map, Selection Order and Electronic Program Guide after the Setting of the Channel Order)

FIG. 19 shows an example of the changed channel map employed when the same program can be received in both the digital broadcast and the analog broadcast.

Figure 20:
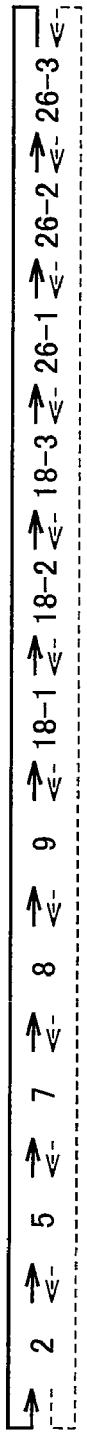
FIG. 20 shows an order in which the channel selection moves when the channel map of FIG. 19 is used and the user depresses the increment/decrement buttons.

FIG. 20 shows an order in which the channel selection moves when the channel map of FIG. 19 is used and the user depresses the increment/decrement buttons.

Channel order setting unit 12 rewrites the channel map as shown in FIG. 19. More specifically, the same program is broadcast on the channel "8" of the analog broadcast as well as the channels "8-1", "8-2" and "8-3" of the digital broadcast. Therefore, channel order setting unit 12 sets the address "0x70" of the channel "9" as the address of the channel following the channel "8" so that the channel selection may skip the channels "8-1", "8-2" and "8-3" of the digital broadcast and may move to the channel "9" when the channel "8" is currently selected and the user selects the increment button. Also, channel order setting unit 12 sets the address "0x30" of the channel "8" as the address of the channel preceding the channel "9" so that the channel selection may skip the channels "8-3", "8-2" and "8-1", and may move to the channel "8" when the channel "9" is currently selected and the user selects the decrement button.

Channel switching unit 13 moves the channel selection in the order shown in FIG. 20 according to the updated channel map of FIG. 19. Thus, when the user depresses the increment button, channel switching unit 13 moves the channel selection in the direction of solid line. When the user depresses the decrement button, it moves the channel selection in the direction of dotted line. For example, when the channel "8" is currently selected and the user depresses the increment button, channel switching unit 13 reads the address "0x70" of the next channel from the information about the channel "8" in the channel map of FIG. 19, specifies the channel number "9" stored at the address "0x70" and moves the selection to the channel "9". When the channel "9" is currently selected and the user depresses the decrement button, channel switching unit 13 reads the address "0x30" of the previous channel from the information about the channel "9" in the channel map of FIG. 19, specifies the channel number "8" stored at the address "0x30" and moves the selection to the channel "8".

FIG. 21 shows an electronic program guide provided when the channel map of FIG. 19 is used.

Referring to FIG. 21, program guide display unit 15 arranges, in the first column of the electronic program guide, the programs on the channel "2" that bears the leading channel flag S in the channel map of FIG. 19 and is in the first selection position. Program guide display unit 15 reads the address "0x10" of the next channel from the information about the channel "2" in the channel map of FIG. 19, specifies the channel number "5" stored at the address "0x10" and arranges, in the second column of the electronic program guide, the programs on the channel "5" that is in the second selection position. Likewise, it arranges, in the other columns, the titles of the programs on the channels in the selection positions corresponding to the respective columns.

As shown in FIG. 21, the electronic program guide may be displayed for all the channels in the channel map, and may also be displayed for only a part of the channels. For example, the electronic program guide may be displayed for only four channels that occupy the consecutive selection positions in the channel map. The user can operate the right/left buttons to change the channel in the electronic program guide, and can operate the up/down buttons to change the time band in the electronic program guide.

According to the broadcast receiving device of the fourth embodiment, as described above, when the same program is broadcast on the channel of the analog broadcast and that of the digital broadcast, the channel of the digital broadcast is not selected so that the same program is not selected multiple times.

Modification of the Fourth Embodiment

In the fourth embodiment, the working channel map can be created instead of changing the channel map, and can be used for switching the channel selection, similarly to the modification of the first embodiment.

FIG. 22 shows an example of the working channel map that defines a channel selection order similar to that in the channel map of FIG. 19.

Referring to FIG. 22, the information items about the channels in earlier selection positions are stored at the smaller addresses. The working channel map of FIG. 22 stores the information about the channels in the order of selection shown in FIG. 20.

Fifth Embodiment

In a fifth embodiment, when the analog broadcast has a channel that provides the same program as that on channels of the digital broadcast, channel order setting unit 12 rewrites the channel map so that this channel of the analog broadcast as well as sub-channels (X-2 and X-3) other than a representative channel (X-1) of the digital broadcast may not be selected. Further, when the program is provided only by the digital broadcast, channel order setting unit 12 rewrites the channel map so that only the representative channel (X-1) may be selected.

(Specific Examples of the Channel Map, Selection Order and Electronic Program Guide after the Setting of the Channel Order)

FIG. 23 shows another example of the changed channel map employed when the same program can be received from both the digital broadcast and the analog broadcast.

Figures 24, 25, 26:
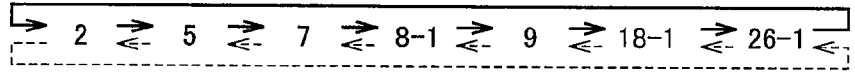
FIG. 24 shows an order in which the channel selection moves when the channel map of FIG. 23 is used and the user depresses the increment/decrement buttons.
FIG. 25 shows an electronic program guide provided when the channel map of FIG. 23 is used.
FIG. 26 shows an example of the working channel map that defines a channel selection order similar to that in the channel map of FIG. 23.

FIG. 24 shows an order in which the channel selection moves when the channel map of FIG. 23 is used and the user depresses the increment/decrement buttons. Channel order setting unit 12 rewrites the channel map as shown in FIG. 23.

More specifically, the same program is broadcast on the channels "8-1", "8-2" and "8-3" of the digital broadcast as well as the channel "8" of the analog broadcast. Therefore, channel order setting unit 12 sets an address "0x40" of the channel "8-1" as the address of the channel following the channel "7" so that the channel selection may skip the channel "8" of the analog broadcast and may move to the channel "8-1" when the channel "7" is currently selected and the user selects the increment button. Also, channel order setting unit 12 sets the address "0x20" of the channel "7" as the address of the channel preceding the channel "8-1" so that the channel selection may skip the channel "8-1" and may move to the channel "7" when the channel "8-1" is currently selected and the user selects the decrement button.

Channel switching unit 13 moves the channel selection in the order shown in FIG. 24 according to the updated channel map of FIG. 23. Thus, when the user depresses the increment button, channel switching unit 13 moves the channel selection in the direction of solid line. When the user depresses the decrement button, it moves the channel selection in the direction of dotted line. For example, when the channel "7" is currently selected and the user depresses the increment button, channel switching unit 13 reads the address "0x40" of the next channel from the information about the channel "7" in the channel map of FIG. 23, specifies the channel number "8-1" stored at the address "0x40" and moves the selection to the channel "8-1". When the channel "8-1" is currently selected and the user depresses the decrement button, channel switching unit 13 reads the address "0x20" of the previous channel from the information about the channel "8-1" in the channel map of FIG. 23, specifies the channel number "7" stored at the address "0x20" and moves the selection to the channel "7".

FIG. 25 shows an electronic program guide provided when the channel map of FIG. 23 is used.

Referring to FIG. 25, program guide display unit 15 arranges, in the first column of the electronic program guide, the programs on the channel "2" that bears the leading channel flag S in the channel map of FIG. 23 and is in the first selection position. Program guide display unit 15 reads the address "0x10" of the next channel from the information about the channel "2" in the channel map of FIG. 23, specifies the channel number "5" stored at the address "0x10" and arranges, in the second column of the electronic program guide, the programs on the channel "5" that is in the second selection position. Likewise, it arranges, in the other columns, the titles of the programs on the channels in the selection positions corresponding to the respective columns.

As shown in FIG. 25, the electronic program guide may be displayed for all the channels in the channel map, and may also be displayed for only a part of the channels. For example, the electronic program guide may be displayed for only four channels that occupy the consecutive selection positions in the channel map. The user can operate the right/left buttons to change the channel in the electronic program guide, and can operate the up/down buttons to change the time band in the electronic program guide.

According to the broadcast receiving device of the fifth embodiment, as described above, when the analog broadcast has the channel that provides the same program as that on the channels of the digital broadcast, the channel of the analog broadcast is not selected, and further only the representative channel is selected in the digital broadcast so that the same program is not selected multiple times.

Modification of the Fifth Embodiment

In the fifth embodiment, the working channel map can be created instead of changing the channel map, and can be used for switching the channel selection, similarly to the modification of the first embodiment.

FIG. 26 shows an example of the working channel map that defines a channel selection order similar to that in the channel map of FIG. 23.

Referring to FIG. 26, the information items about the channels in earlier selection positions are stored at the smaller addresses. The working channel map of FIG. 26 stores the information about the channels in the order of selection shown in FIG. 24.

Sixth Embodiment

In a sixth embodiment, when the channels of the digital broadcast and the channels of the analog broadcast are present in a mixed fashion in the channel map, channel order setting unit 12 rewrites the channel map so that only the channels of the analog broadcast may first be selected successively, and then only the channels of the digital broadcast may be selected successively.

(Specific Examples of the Channel Map, Selection Order and Electronic Program Guide after the Setting of the Channel Order)

FIG. 27 shows an example of the changed channel map employed when both the digital broadcast and the analog broadcast can be received.

Figure 28:
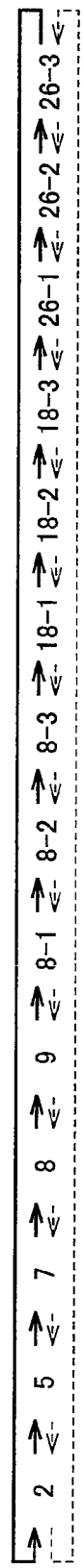
FIG. 28 shows an order in which the channel selection moves when the channel map of FIG. 27 is used and the user depresses the increment/decrement buttons.

FIG. 28 shows an order in which the channel selection moves when the channel map of FIG. 27 is used and the user depresses the increment/decrement buttons.

Channel order setting unit 12 rewrites the channel map as shown in FIG. 27. More specifically, channel order setting unit 12 sets the address "0x70" of the channel "9" as the address of the channel following the channel "8" so that the channel selection may move not to the channel "8-1" of the digital broadcast but to the channel "9" of the analog broadcast when the channel "8" is currently selected and the user selects the increment button. Also, channel order setting unit 12 sets the address "0x30" of the channel "8" as the address of the channel preceding the channel "9" so that the channel selection may move not to the channel "8-3" but to the channel "8" when the channel "9" is currently selected and the user selects the decrement button.

Channel order setting unit 12 sets the address "0x40" of the channel "8-1" as the address of the channel following the channel "9" so that the channel selection may move not to the channel "18-1" but to the channel "8-1" when the channel "9" is currently selected and the user selects the increment button. Also, channel order setting unit 12 sets the address "0x70" of the channel "9" as the address of the channel preceding the channel "8-1" so that the channel selection may move not to the channel "8" but to the channel "9" when the channel "8-1" is currently selected and the user selects the decrement button.

Channel order setting unit 12 sets the address "0x80" of the channel "18-1" as the address of the channel following the channel "8-3" so that the channel selection may move not to the channel "9" but to the channel "18-1" when the channel "8-3" is currently selected and the user selects the increment button. Also, channel order setting unit 12 sets the address "0x60" of the channel "8-3" as the address of the channel preceding the channel "18-1" so that the channel selection may move not to the channel "9" but to the channel "8-3" when the channel "18-1" is currently selected and the user selects the decrement button.

Channel switching unit 13 moves the channel selection in the order shown in FIG. 28 according to the updated channel map of FIG. 27. Thus, when the user depresses the increment button, channel switching unit 13 moves the channel selection in the direction of solid line. When the user depresses the decrement button, it moves the channel selection in the direction of dotted line. For example, when the channel "8" is currently selected and the user depresses the increment button, channel switching unit 13 reads the address "0x70" of the next channel from the information about the channel "8" in the channel map of FIG. 27, specifies the channel number "9" stored at the address "0x70" and moves the selection to the channel "9". When the channel "9" is currently selected and the user depresses the decrement button, channel switching unit 13 reads the address "0x30" of the previous channel from the information about the channel "9" in the channel map of FIG. 27, specifies the channel number "8" stored at the address "0x30" and moves the selection to the channel "8".

FIG. 29 shows an electronic program guide provided when the channel map of FIG. 27 is used.

Referring to FIG. 29, program guide display unit 15 arranges, in the first column of the electronic program guide, the programs on the channel "2" that bears the leading channel flag S in the channel map of FIG. 27 and is in the first selection position. Program guide display unit 15 reads the address "0x10" of the next channel from the information about the channel "2" in the channel map of FIG. 27, specifies the channel number "5" stored at the address "0x10" and arranges, in the second column of the electronic program guide, the programs on the channel "5" that is in the second selection position. Likewise, it arranges, in the other columns, the titles of the programs on the channels in the selection positions corresponding to the respective columns.

As shown in FIG. 29, the electronic program guide may be displayed for all the channels in the channel map, and may also be displayed for only a part of the channels. For example, the electronic program guide may be displayed for only four channels that occupy the consecutive selection positions in the channel map. The user can operate the right/left buttons to change the channel in the electronic program guide, and can operate the up/down buttons to change the time band in the electronic program guide.

According to the broadcast receiving device of the sixth embodiment, as described above, only the analog broadcasts are successively selected first, and then the digital broadcasts are successively selected. Therefore, it is possible to reduce a setting time required for changing various setting values when the switching is performed from the digital to the analog, and vice versa, and a wait time of the user during the channel selection can be reduced.

Modification of the Sixth Embodiment

In the sixth embodiment, the working channel map can be created instead of changing the channel map, and can be used for switching the channel selection, similarly to the modification of the first embodiment.

FIG. 30 shows an example of the working channel map that defines a channel selection order similar to that in the channel map of FIG. 27.

Referring to FIG. 30, the information items about the channels in earlier selection positions are stored at the smaller addresses. The working channel map of FIG. 30 stores the information about the channels in the order of selection shown in FIG. 28.

Seventh Embodiment

In a seventh embodiment, when the channels of the digital broadcast and the channels of the analog broadcast are present in mixed fashion in the channel map, channel order setting unit 12 rewrites the channel map so that only the channels of the digital broadcast may be successively selected first, and then only the channels of the analog broadcast may be successively selected.

(Specific Examples of the Channel Map, Selection Order and Electronic Program Guide after the Setting of the Channel Order)

FIG. 31 shows another example of the changed channel map employed when both the digital broadcast and the analog broadcast can be received.

Figure 32:
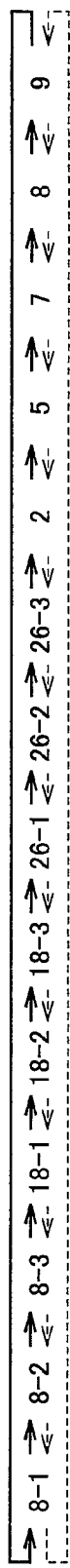
FIG. 32 shows an order in which the channel selection moves when the channel map of FIG. 31 is used and the user depresses the increment/decrement buttons.

FIG. 32 shows an order in which the channel selection moves when the channel map of FIG. 31 is used and the user depresses the increment/decrement buttons.

Channel order setting unit 12 rewrites the channel map as shown in FIG. 31. More specifically, channel order setting unit 12 sets leading channel flag S on the channel "8-1" that is the channel of the digital broadcast so that the channels of the digital broadcast can be selected first.

Also, channel order setting unit 12 sets the address "0x80" of the channel "18-1" as the address of the channel following the channel "8-3" so that the channel selection may move not to the channel "9" but to the channel "18-1" when the channel "8-3" is currently selected and the user selects the increment button. Also, channel order setting unit 12 sets the address "0x60" of the channel "8-3" as the address of the channel preceding the channel "18-1" so that the channel selection may move not to the channel "9" but to the channel "8-3" when the channel "18-1" is currently selected and the user selects the decrement button.

Channel order setting unit 12 sets the address "0x70" of the channel "9" as the address of the channel following the channel "8" so that the channel selection may move not to the channel "8-1" but to the channel "9" when the channel "8" is currently selected and the user selects the increment button. Also, channel order setting unit 12 sets the address "0x30" of the channel "8" as the address of the channel preceding the channel "9" so that the channel selection may move not to the channel "8-3" but to the channel "8" when the channel "9" is currently selected and the user selects the decrement button.

Channel order setting unit 12 sets the address "0x40" of the channel "8-1" as the address of the channel following the channel "9" so that the channel selection may move not to the channel "18-1" but to the channel "8-1" when the channel "9" is currently selected and the user selects the increment button. Also, channel order setting unit 12 sets the address "0x70" of the channel "9" as the address of the channel preceding the channel "8-1" so that the channel selection may move not to the channel "8" but to the channel "9" when the channel "8-1" is currently selected and the user selects the decrement button.

Channel switching unit 13 moves the channel selection in the order shown in FIG. 32 according to the updated channel map of FIG. 31. Thus, when the user depresses the increment button, channel switching unit 13 moves the channel selection in the direction of solid line. When the user depresses the decrement button, it moves the channel selection in the direction of dotted line.

For example, when the channel "8-3" is currently selected and the user depresses the increment button, channel switching unit 13 reads the address "0x80" of the next channel from the information about the channel "8-3" in the channel map of FIG. 31, specifies the channel number "18-1" stored at the address "0x80" and moves the selection to the channel "18-1". When the channel "18-1" is currently selected and the user depresses the decrement button, channel switching unit 13 reads the address "0x60" of the previous channel from the information about the channel "18-1" in the channel map of FIG. 31, specifies the channel number "8-3" stored at the address "0x60" and moves the selection to the channel "8-3".

FIG. 33 shows an electronic program guide provided when the channel map of FIG. 31 is used.

Referring to FIG. 33, program guide display unit 15 arranges, in the first column of the electronic program guide, the programs on the channel "8-1" that bears the leading channel flag S in the channel map of FIG. 31 and is in the first selection position. Program guide display unit 15 reads the address "0x50" of the next channel from the information about the channel "8-1" in the channel map of FIG. 31, specifies the channel number "8-2" stored at the address "0x50" and arranges, in the second column of the electronic program guide, the programs on the channel "8-2" that is in the second selection position. Likewise, it arranges, in the other columns, the titles of the programs on the channels in the selection positions corresponding to the respective columns.

As shown in FIG. 33, the electronic program guide may be displayed for all the channels in the channel map, and may also be displayed for only a part of the channels. For example, the electronic program guide may be displayed for only four channels that occupy the consecutive selection positions in the channel map. The user can operate the right/left buttons to change the channel in the electronic program guide, and can operate the up/down buttons to change the time band in the electronic program guide.

According to the broadcast receiving device of the seventh embodiment, as described above, only the digital broadcasts are successively selected first, and then the analog broadcasts are selected. Therefore, it is possible to reduce a setting time required for changing various setting values when the switching is performed from the digital to the analog, and vice versa, and a wait time of the user during the channel selection can be reduced.

Modification of the Seventh Embodiment

In the seventh embodiment, the working channel map can be created instead of changing the channel map, and can be used for switching the channel selection, similarly to the modification of the first embodiment.

FIG. 34 shows an example of the working channel map that defines a channel selection order similar to that in the channel map of FIG. 31.

Referring to FIG. 34, the information items about the channels in earlier selection positions are stored at the smaller addresses. The working channel map of FIG. 34 stores the information about the channels in the order of selection shown in FIG. 32.

Eighth Embodiment

In an eighth embodiment, when the channel map includes the channel of the digital broadcast that includes a plurality of sub-channels, channel order setting unit 12 rewrites the channel map to allow selection of only one of the sub-channels for such channel. For example, the representative channel bearing the smallest number is used as the sub-channel that can be selected.

(Specific Examples of the Channel Map, Selection Order and Electronic Program Guide after the Setting of the Channel Order)

FIG. 35 shows another example of the changed channel map employed when the digital broadcast having a plurality of sub-channels can be received.

FIG. 36 shows an order in which the channel selection moves when the channel map of FIG. 35 is used and the user depresses the increment/decrement buttons.

Channel order setting unit 12 rewrites the channel map as shown in FIG. 35. More specifically, three sub-channels "8-1", "8-2" and "8-3" are present in one channel, and therefore channel order setting unit 12 sets the address "0x70" of the channel "9" as the address of the channel following the channel "8-1" so that the channel selection may skip the channels "8-2" and "8-3" and may move to the channel "9" when the channel "8-1" is currently selected and the user selects the increment button. Also, channel order setting unit 12 sets the address "0x40" of the channel "8-1" as the address of the channel preceding the channel "9" so that the channel selection may skip the channels "8-3" and "8-2" and may move to the channel "8-1" when the channel "9" is currently selected and the user selects the decrement button.

Since three sub-channels "8-1", "8-2" and "8-3" are present in one channel, channel order setting unit 12 sets an address "0xB0" of a channel "26-1" as the address of the channel following the channel "18-1" so that the channel selection may skip the channels "18-2" and "18-3" and may move to the channel "26-1" when the channel "18-1" is currently selected and the user selects the increment button. Also, channel order setting unit 12 sets the address "0x80" of the channel "18-1" as the address of the channel preceding the channel "26-1" so that the channel selection may skip the channels "18-3" and "18-2" and may move to the channel "18-1" when the channel "26-1" is currently selected and the user selects the decrement button.

Since three sub-channels "26-1", "26-2" and "26-3" are present in one channel, channel order setting unit 12 sets an address "0x00" of the channel "2" as the address of the channel following the channel "26-1" so that the channel selection may skip the channels "26-2" and "26-3" and may move to the channel "2" when the channel "26-1" is currently selected and the user selects the increment button. Also, channel order setting unit 12 sets an address "0xA0" of the channel "26-1" as the address of the channel preceding the channel "2" so that the channel selection may skip the channels "26-3" and "26-2" and may move to the channel "26-1" when the channel "2" is currently selected and the user selects the decrement button.

Channel switching unit 13 moves the channel selection in the order shown in FIG. 36 according to the updated channel map of FIG. 35. Thus, when the user depresses the increment button, channel switching unit 13 moves the channel selection in the direction of solid line. When the user depresses the decrement button, it moves the channel selection in the direction of dotted line.

For example, when the channel "8-1" is currently selected and the user depresses the increment button, channel switching unit 13 reads the address "0x70" of the next channel from the information about the channel "8-1" in the channel map of FIG. 35, specifies the channel number "9" stored at the address "0x70" and moves the selection to the channel "9". When the channel "9" is currently selected and the user depresses the decrement button, channel switching unit 13 reads the address "0x40" of the previous channel from the information about the channel "9" in the channel map of FIG. 35, specifies the channel number "8-1" stored at the address "0x40" and moves the selection to the channel "8-1".

FIG. 37 shows an electronic program guide provided when the channel map of FIG. 35 is used.

Referring to FIG. 37, program guide display unit 15 arranges, in the first column of the electronic program guide, the programs on the channel "2" that bears the leading channel flag S in the channel map of FIG. 35 and is in the first selection position. Program guide display unit 15 reads the address "0x10" of the next channel from the information about the channel "2" in the channel map of FIG. 35, specifies the channel number "5" stored at the address "0x10" and arranges, in the second column of the electronic program guide, the programs on the channel "5" that is in the second selection position. Likewise, it arranges, in the other columns, the titles of the programs on the channels in the selection positions corresponding to the respective columns.

As shown in FIG. 37, the electronic program guide may be displayed for all the channels in the channel map, and may also be displayed for only a part of the channels. For example, the electronic program guide may be displayed for only four channels that occupy the consecutive selection positions in the channel map. The user can operate the right/left buttons to change the channel in the electronic program guide, and can operate the up/down buttons to change the time band in the electronic program guide.

According to the broadcast receiving device of the eighth embodiment, as described above, the channel having the plurality of sub-channels is handled to allow selection of only one of these sub-channels so that the same program is not selected multiple times Modification of the Eighth Embodiment In the eighth embodiment, the working channel map can be created instead of changing the channel map, and can be used for switching the channel selection, similarly to the modification of the first embodiment.

FIG. 38 shows an example of the working channel map that defines a channel selection order similar to that in the channel map of FIG. 35.

Referring to FIG. 38, the information items about the channels in earlier selection positions are stored at the smaller addresses. The working channel map of FIG. 38 stores the information about the channels in the order of selection shown in FIG. 36.

Ninth Embodiment

Figure 39:
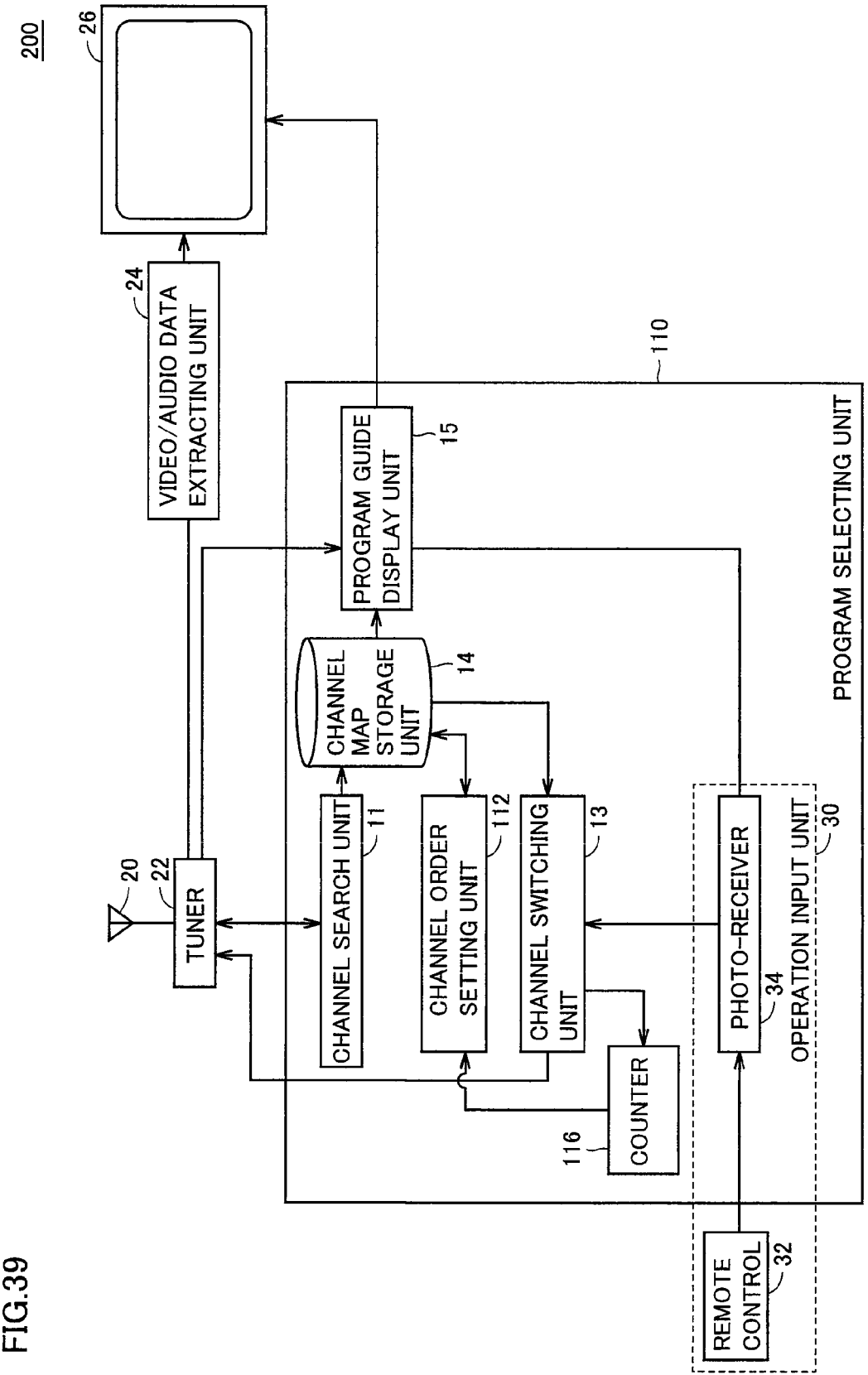
FIG. 39 shows a structure of the broadcast receiving device of a ninth embodiment.

FIG. 39 shows a structure of the broadcast receiving device of a ninth embodiment.

Referring to FIG. 39, this broadcast receiving device 200 differs from broadcast receiving device 100 in FIG. 1 in that a counter 116 is added, and also differs therefrom in function of a channel order setting unit 112.

Counter 116 stores the number of times of program watching per channel in the channel map. When the user does not perform an operation of selecting another channel within a predetermined time, e.g., of 3 minutes after the user selected a certain channel by operating the increment/decrement button or by selecting the channel number, counter 116 regards that the user has watched the program on the selected channel, and increments the number of times of watching of the selected channel (more specifically, watching of the program on the selected channel).

Channel order setting unit 112 changes the selection order of the channels in the channel map such that the channels that were watched more times according to storage of counter 116 are successively selected earlier.

(Specific Examples of the Channel Map, Selection Order and Electronic Program Guide after the Setting of the Channel Order)

FIG. 40 shows, by way of example, counts stored in the counter.

Referring to FIG. 40, counter 116 stores the number of times of the watching for each channel. For example, the channel "2" has been watched 112 times, and the channel "5" has been watched 359 times.

Figure 42:
FIG. 42 shows an order in which the channel selection moves when the channel map of FIG. 41 is used and the user depresses the increment/decrement buttons.

FIG. 41 shows, by way of example, the changed channel map employed when the counts in FIG. 40 are used. FIG. 42 shows an order in which the channel selection moves when the channel map of FIG. 41 is used and the user depresses the increment/decrement buttons.

Channel order setting unit 112 updates the channel map so that the channels may be selected in descending order of the count in FIG. 40. More specifically, since the channel "8-1" exhibits the largest count, channel order setting unit 112 sets the leading channel flag S on the channel "8-1". Since the channel "5" exhibits the second largest count, channel order setting unit 112 sets the address "0x10" of the channel "5" as the next address of the channel "8-1". Also, channel order setting unit 112 sets the address "0x40" of the channel "8-1" as the previous address of the channel "5". Since the channel "8" exhibits the next largest count, channel order setting unit 112 sets the address "0x30" of the channel "8" as the next address of the channel "5". Also, channel order setting unit 112 sets the address "0x10" of the channel "5" as the previous address of the channel "8". For the channels of the counts following the above, channel order setting unit 112 sets the addresses of the next channels and the previous channels similarly to the above.

Channel switching unit 13 moves the channel selection in the order shown in FIG. 42 according to the updated channel map of FIG. 41. Thus, when the user depresses the increment button, channel switching unit 13 moves the channel selection in the direction of solid line. When the user depresses the decrement button, it moves the channel selection in the direction of dotted line.

For example, when the channel "8-1" is currently selected and the user depresses the increment button, channel switching unit 13 reads the address "0x10" of the next channel from the information about the channel "8-1" in the channel map of FIG. 41, specifies the channel number "5" stored at the address "0x10" and moves the selection to the channel "5". When the channel "5" is currently selected and the user depresses the increment button, channel switching unit 13 reads the address "0x40" of the previous channel from the information about the channel "5" in the channel map of FIG. 41, specifies the channel number "8-1" stored at the address "0x40" and moves the selection to the channel "8-1".

FIG. 43 shows an electronic program guide provided when the channel map of FIG. 41 is used.

Referring to FIG. 43, program guide display unit 15 arranges, in the first column of the electronic program guide, the programs on the channel "8-1" that bears the leading channel flag S in the channel map of FIG. 41 and is in the first selection position. Program guide display unit 15 reads the address "0x10" of the next channel from the information about the channel "8-1" in the channel map of FIG. 41, specifies the channel number "5" stored at the address "0x10" and arranges, in the second column of the electronic program guide, the programs on the channel "5" that is in the second selection position. Likewise, it arranges, in the other columns, the titles of the programs on the channels in the selection positions corresponding to the respective columns.

As shown in FIG. 43, the electronic program guide may be displayed for all the channels in the channel map, and may also be displayed for only a part of the channels. For example, the electronic program guide may be displayed for only four channels that occupy the consecutive selection positions in the channel map. The user can operate the right/left buttons to change the channel in the electronic program guide, and can operate the up/down buttons to change the time band in the electronic program guide.

According to the broadcast receiving device of the ninth embodiment, as described above, the channels that have been selected more times will be selected earlier so that the channel selection can be performed in order of degree of the user's liking.

First Modification of the Ninth Embodiment

In the ninth embodiment, the working channel map can be created instead of changing the channel map, and can be used for switching the channel selection, similarly to the modification of the first embodiment.

FIG. 44 shows an example of the working channel map that defines a channel selection order similar to that in the channel map of FIG. 41.

Referring to FIG. 44, the information items about the channels in earlier selection positions are stored at the smaller addresses. The working channel map of FIG. 44 stores the information about the channels in the order of selection shown in FIG. 42.

Tenth Embodiment

Figure 45:
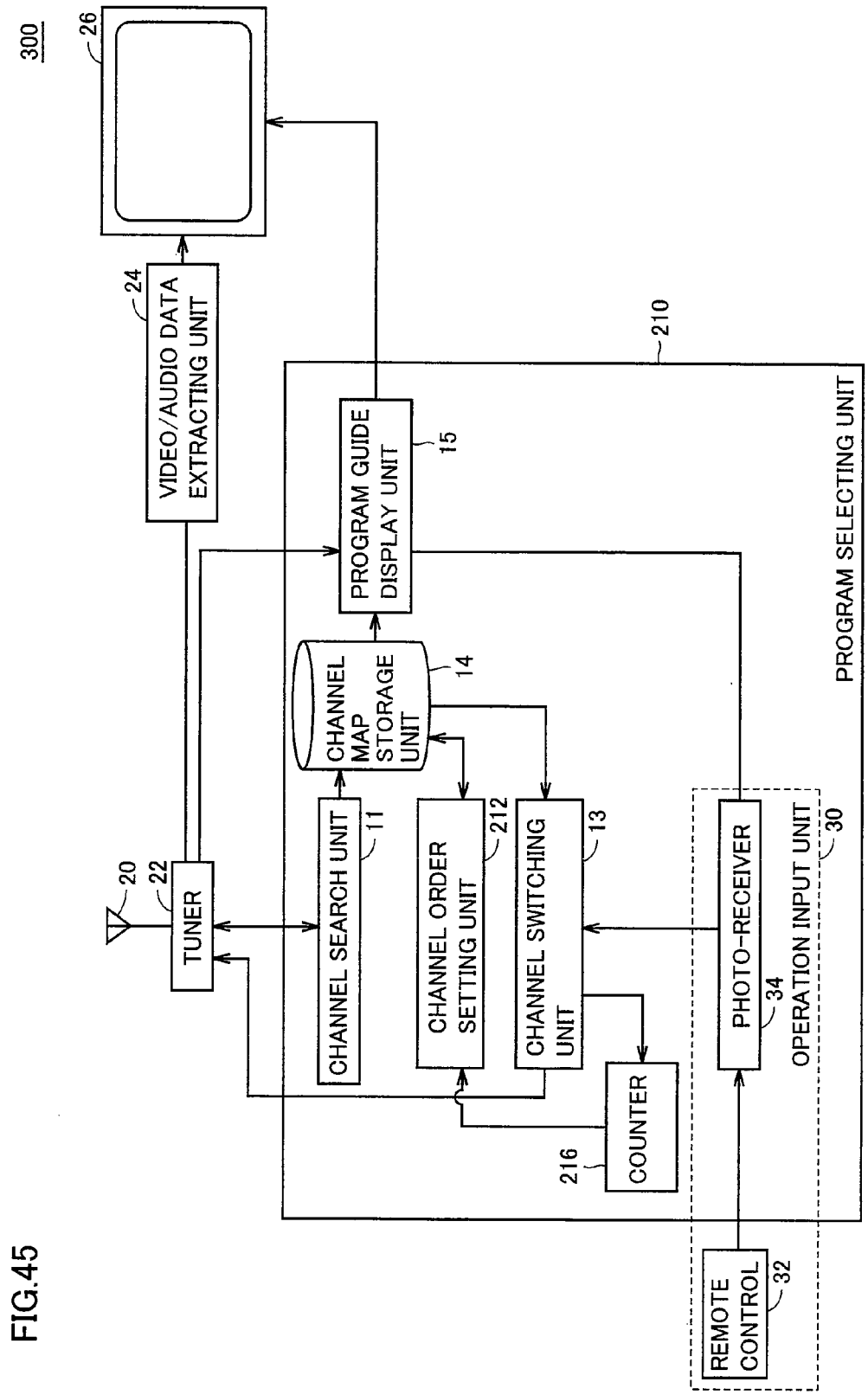
FIG. 45 shows a structure of a broadcast receiving device of an eighth embodiment.

FIG. 45 shows a structure of the broadcast receiving device of a tenth embodiment.

Referring to FIG. 45, this broadcast receiving device 300 differs from broadcast receiving device 100 in FIG. 1 in that a counter 216 is added, and also differs therefrom in function of a channel order setting unit 212.

Counter 216 stores the number of times of the change of the watching channel (i.e., the channel on which program is watched), and more specifically, stores the number per channel in the channel map. Counter 216 regards that the selected channel is the watching channel when the user does not perform an operation of selecting another channel within a predetermined time, e.g., of 3 minutes after the user selected the channel by operating the increment/decrement button or selecting the channel number. When counter 216 regards a second channel as the watching channel after it regarded a first channel as the watching channel, counter 216 increments the number of times of the change of program-watching to the second channel in connection with the first channel.

Counter 216 has stored, for each channel in the channel map, the number of times of change of the watching channel, and channel order setting unit 212 changes the selection order of the channels in the channel map during the watching of the programs on these channels such that the channels to which the channel in question is changed for program watching more frequently may be successively selected earlier.

(Specific Examples of the Channel Map, Selection Order and Electronic Program Guide after the Setting of the Channel Order)

FIG. 46(a) shows, by way of example, a number that is stored in the counter and represents the times of the change of the watching channel from the channel "2" to other channels, and (b) shows the number of times of the change of the watching channel from the channel "5" to other channels.

FIG. 47 shows, by way of example, the changed channel map employed when the count takes values in FIGS. 46(a) and 46(b), respectively.

Figure 48:
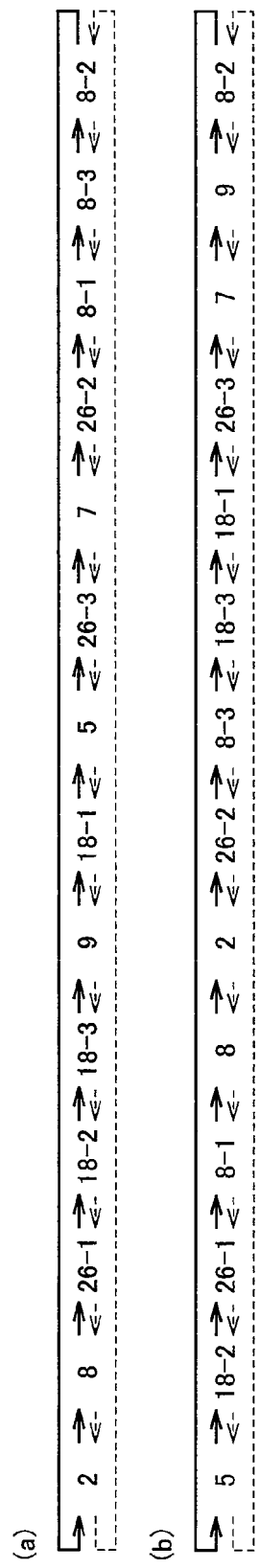
FIG. 48(a) shows an order in which the channel selection moves when the channel map of FIG. 47 is used, a channel "2" is a current watching channel and the user depresses increment/decrement buttons.
FIG. 48(b) shows an order in which the channel selection moves when the channel map of FIG. 47 is used, a channel "5" is a current watching channel and the user depresses increment/decrement buttons.

FIG. 48(a) shows the order in which the channel selection moves when the channel map of FIG. 47 is used, the channel "2" is the current watching channel (i.e., the channel on which program is being watched) and the user depresses the increment/decrement buttons, and FIG. 48(b) shows an order in which the channel selection moves when the channel map of FIG. 47 is used, the channel "5" is the current watching channel and the user depresses the increment/decrement buttons.

Channel order setting unit 212 updates the channel map so that the channel selection may move in descending order of the count in FIG. 46(a), when the channel "2" is the current watching channel. More specifically, since the channel "8" exhibits the largest count, channel order setting unit 212 sets the address "0x30" of the channel "8" as the next address of the channel "2". Also, channel order setting unit 212 sets the address "0x00" of the channel "2" as the previous address of the channel "8". Since the channel "26-1" exhibits the second largest count, channel order setting unit 212 sets the address "0xB0" of the channel "26-1" as the next address of the channel "8". Also, channel order setting unit 212 sets the address "0x30" of the channel "8" as the previous address of the channel "26-1". For the channels of the counts following the above, channel order setting unit 212 sets the addresses of the next channels and the previous channels similarly to the above.

Channel order setting unit 212 updates the channel map such that the channel selection may move in descending order of the count in FIG. 46(b), when the current "5" is the current watching channel. Thus, the channel "18-2" exhibits the largest count so that channel order setting unit 212 sets an address "0x90" of the channel "18-2" as the next address of the channel "5". Channel order setting unit 212 also sets the address "0x10" of the channel "5" as the previous address of the channel "18-2". Since the channel "26-1" exhibits the second largest count, channel order setting unit 212 sets the address "0xB0" of the channel "26-1" as the next address of the channel "18-2". Channel order setting unit 212 also sets the address "0x90" of the channel "18-2" as the previous address of the channel "26-1". For the channels of the counts following the above, channel order setting unit 212 sets the addresses of the next channels and the previous channels similarly to the above.

Channel order setting unit 212 sets the addresses of the next and previous channels when the channel other than channels "2" and "5" is the current watching channel.

According to the updated channel map of FIG. 47, channel switching unit 13 moves the channel selection in the order shown in FIG. 48(a), when the channel "2" is the current watching channel. When the channel "5" is the current watching channel, channel switching unit 13 moves the channel selection in the order shown in FIG. 48(b). Thus, when the user depresses the increment button, channel switching unit 13 moves the channel selection in the direction of solid line. When the user depresses the decrement button, it moves the channel selection in the direction of dotted line. It is regarded that the currently selected channel is the current watching channel when the user does not perform an operation of selecting another channel within a predetermined time, e.g., of 3 minutes after the channel selection is moved last.

For example, when the current watching channel is "2" and the user depresses the increment button while the channel "8-1" is being selected, channel switching unit 13 reads the address "0x60" of the next channel from the information about the channel "8-1" in the channel map of FIG. 47, specifies the channel number "8-3" stored at the address "0x60" and moves the selection to the channel "8-3". When the user depresses the increment or decrement button within a predetermined time, e.g., of 3 minutes thereafter, the channel selection moves in a similar manner. When the user depresses neither the increment button nor the decrement button within a predetermined time, e.g., of 3 minutes thereafter, the channel "8-3" is set as the current watching channel.

When the channel "5" is the current watching channel and the user depresses the decrement button while the channel "8-1" is being selected, channel switching unit 13 reads the address "0xB0" of the next channel from the information about the channel "8-1" in the channel map of FIG. 47, specifies the channel number "26-1" stored at the address "0xB0" and moves the selection to the channel "26-1". When the user depresses the increment or decrement button within a predetermined time, e.g., of 3 minutes thereafter, the channel selection moves in a similar manner. When the user depresses neither the increment button nor the decrement button within a predetermined time, e.g., of 3 minutes thereafter, the channel "26-3" is set as the current watching channel.

Channel switching unit 13 moves the channel selection in a manner similar to the above when the channel other than channels "2" and "5" is the current watching channel.

FIG. 49(a) shows the electronic program guide provided when the channel map of FIG. 47 is used and the channel "2" is the current watching channel.

Referring to FIG. 49(a), program guide display unit 15 arranges, in the first column of the electronic program guide, the programs on the channel "2" that is currently watched. Program guide display unit 15 reads the address "0x30" of the next channel from the information about the channel "2" in the column where the current watching channel is the channel "2" in the channel map of FIG. 47, specifies the channel number "8" stored at the address "0x30" and arranges, in the second column of the electronic program guide, the programs on the channel "8". Likewise, it arranges, in the other columns, the titles of the programs on the channels in the selection positions corresponding to the respective columns.

FIG. 49(b) shows the electronic program guide provided when the channel map of FIG. 47 is used and the current watching channel is the channel "5".

Referring to FIG. 49(b), program guide display unit 15 arranges, in the first column of the electronic program guide, the programs on the channel "5" that is currently watched. Program guide display unit 15 reads the address "0x90" of the next channel from the information about the channel "5" in the column where the current watching channel is the channel "5" in the channel map of FIG. 47, specifies the channel number "18-2" stored at the address "0x90" and arranges, in the second column of the electronic program guide, the programs on the channel "18-2". Likewise, it arranges, in the other columns, the titles of the programs on the channels in the selection positions corresponding to the respective columns.

Program guide display unit 15 displays the electronic program guide in a manner similar to the above when the channel other than channels "2" and "5" is the current watching channel.

As shown in FIGS. 49(a) and 49(b), the electronic program guide may be displayed for all the channels in the channel map, and may also be displayed for only a part of the channels. For example, the electronic program guide may be displayed for only four channels that occupy the consecutive selection positions in the channel map. The user can operate the right/left buttons to change the channel in the electronic program guide, and can operate the up/down buttons to change the time band in the electronic program guide.

According to the broadcast receiving device of the tenth embodiment, as described above, the channels that are viewed more times after a specific channel A was watched can be switched earlier from the specific channel A. Therefore, the channel selection can be performed in the order reflecting the user's liking in channel selection.

Modification of the Ninth Embodiment

In the tenth embodiment, the working channel map can be created instead of changing the channel map, and can be used for switching the channel selection, similarly to the modification of the first embodiment.

FIGS. 50(a) and 50(b) show, by way of example, working channel maps that define a channel selection order similar to that in the channel map of FIG. 47.

Referring to FIGS. 50(a) and 50(b), the information items about the channels in earlier selection positions are stored at the smaller addresses. The working channel maps in FIGS. 50(a) and 50(b) store the information about the channels in the order of selection shown in FIGS. 48(a) and 48(b).

Eleventh Embodiment

In an eleventh embodiment, channel switching unit 13 causes tuner 22 to receive the broadcast data on the selected channel, and reads the channel number of the channel immediately following or preceding the selected channel with reference to the channel map.

Figure 51:
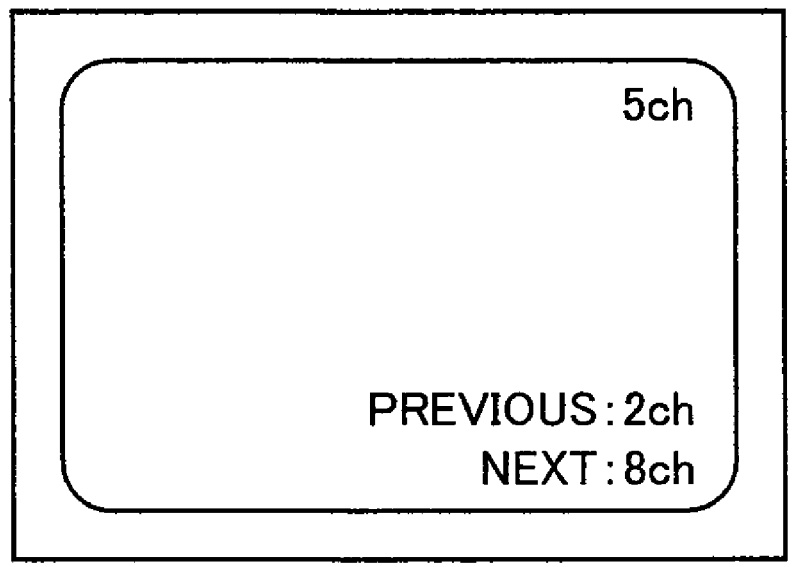
FIG. 51 shows, by way of example, the channel numbers displayed in an eleventh embodiment.

FIG. 51 shows, by way of example, the displayed channel numbers.

Referring to FIG. 51, channel switching unit 13 displays, on television set 26, the channel number "5ch" of the selected channel, the channel number "8ch" of the channel in the following selection position" and the channel number "2ch" in the immediately preceding selection position.

As described above, the broadcast receiving device of the eleventh embodiment displays the number of the channel that can be subsequently selected so that the user can know in advance the channel that will be subsequently selected.

Modifications of the Eleventh Embodiment

In the eleventh embodiment, television set 26 displays the channel number "5ch" of the selected channel, the channel number "8ch" of the channel in the following selection position and the channel number "2ch" in the immediately preceding selection position. However, this is not restrictive. For example, the embodiment may be modified to display the channel number "5ch" of the selected channel and the channel number "8ch" of the channel in the following selection position, to display the channel number "5ch" of the selected channel and the channel number "2ch" in the immediately preceding selection position, to display only the channel number "8ch" of the channel in the following selection position, and to display only the channel number "2ch" in the immediately preceding selection position.

Twelfth Embodiment

Figure 52:
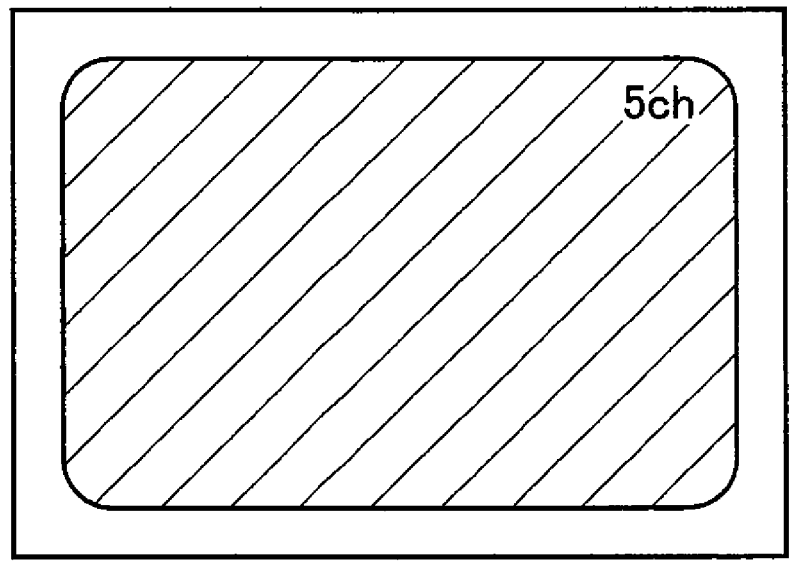
FIG. 52 shows, by way of example, the channel numbers displayed in a twelfth embodiment.

In a twelfth embodiment, channel switching unit 13 selects the channel according to the channel map to display the number of the selected channel as shown in FIG. 52, but causes tuner 22 not to display the broadcast data of the selected channel. When the user does not perform an operation of selecting another channel within a predetermined time, e.g., of 10 second after the user selected a certain channel, channel switching unit 13 regards that the user intends to watch the program on the currently selected channel, and causes tuner 22 to receive the broadcast data on the selected channel.

As described above, the broadcast receiving device of the twelfth embodiment selects only the intended channels, and therefore can prevent tuner 22 from uselessly selecting the channels.

Modification of the Twelfth Embodiment

In the twelfth embodiment, the number of the selected channel is first displayed, and tuner 22 will receive the broadcast data on the selected channel when the operation of selecting another channel is not performed within a predetermined time. However, this is not restrictive.

For example, channel switching unit 13 may be configured as follows. When the user performs an operation of forwarding or reversing the channel (i.e., an ordinary depressing of the increment/decrement button) not accompanied by the tuning, channel switching unit 13 selects the channel according to the channel map, and displays the number of the selected channel as shown in FIG. 52. However, channel switching unit 13 causes tuner 22 not to receive the broadcast data on the selected channel. Conversely, channel switching unit 13 selects the channel according to the channel map and causes tuner 22 to receive the broadcast data on the selected channel, when the user performs an operation of forwarding or reversing the channel accompanied by the tuning (i.e., a long-time depressing of the increment/decrement button).

(Other Modifications)

Other modifications of the invention are as follows.

(1) Electronic Program Guide

The embodiments of the invention have been described in connection with the case where the channels arranged in the order of intended selection are aligned in the direction in which the columns of the electronic program guide changes, and the times are arranged in the direction of change of the rows. However, this is not restrictive. The channels arranged in the order of intended selection may be aligned in the direction in which the rows of the electronic program guide changes, and the times are arranged in the direction of change of the columns.

(2) Channel Order Setting Based on the Count

In the ninth and tenth embodiments of the invention, the channel order setting unit changes the selection order of the channels in the channel map such that the channels that have been watched more times according to the counts of the counter are successively selected earlier. However, this is not restrictive. For example, the channel order setting unit may change the channel map to disable the selection of the channel that has not been watched a predetermined number of times or more.

(3) Counter

In the ninth and tenth embodiments, the counter may be arranged for each user in view of the fact that a plurality of users may use one broadcast receiving device in a home. In this case, the broadcast receiving device must be configured to require enter of a user's name when the power is turned on. Also, the counter may be arranged for each time band in the case where the user in the home who watches the program depends on the time band.

(4) Reset of the Counter

In the ninth and tenth embodiments, the counter may be configured such that the count (i.e., the number of times of watching) is reset to zero at predetermined intervals, e.g., of one year. Alternatively, the counter may be configured such that it stores the number of times of watching for a quarter over one year, and a total of the numbers of times of watching each counted for a quarter may be obtained over one year for using it when setting the channel order. In this case, the oldest number of times of watching may be reset to zero at intervals of a quarter, and the watching may be counted for a new quarter.

(5) Further Another Modification of the Counter

In the ninth and tenth embodiments of the invention, the counters may be arranged for regular time bands each having a length, e.g., of two hours in each day of the week, respectively. Thereby, it is possible to enhance the possibility that the channel of which possibility of watching is higher can be selected earlier in each of the time bands in each day of the week.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The invention is effective in the broadcast receiving device, and particularly in the television set having a program selecting function in a home.

The invention claimed is:

1. A broadcast receiving device comprising:
a tuner receiving broadcast data on a designated channel;
a search unit searching for available channels by controlling said tuner, and creating a channel map representing the available channels and an order of selection of the channels;
a setting unit creating setting information defining enabling/disabling of the selection and/or change in the selection order for the channels in said channel map;
an operation input unit accepting a user's operation of selecting the channel;
a switching unit changing the selection of the channel according to said setting information when the user performs an operation of forwarding or reversing the channel through said operation input unit, and causing said tuner to receive the broadcast data on said selected channel; and
a counter of storing, for each channel in said channel map, a number of times of change to another channel for watching, regarding that a selected certain channel was watched when the operation of selecting another channel was not performed through said operation input unit within a predetermined time after said certain channel was selected, and incrementing the number of times of watching of said selected channel, wherein
said counter increments the number of times of change for watching from a first channel to a second channel when said counter regarded that said second channel was watched after said first channel was watched, and
said setting unit creates said setting information according to the number of times of change to another channel stored for each of said channel in said counter.

2. The broadcast receiving device according to claim 1, wherein
said setting unit changes the selection order of the channels in said channel map such that, during watching of each channel in said channel map,
the channels are successively selected in descending order of the number of times of the watching stored for each of said channels in said counter.

* * * * *